US010059441B2

(12) United States Patent
Mercer et al.

(10) Patent No.: US 10,059,441 B2
(45) Date of Patent: Aug. 28, 2018

(54) ROTORCRAFT AUTOPILOT SYSTEM, COMPONENTS AND METHODS

(71) Applicant: Merlin Technology Inc., Kent, WA (US)

(72) Inventors: John E. Mercer, Gig Harbor, WA (US); Marc Feifel, Seattle, WA (US); Mark Marvin, Tacoma, WA (US); Nicolas Albion, Burien, WA (US)

(73) Assignee: MERLIN TECHNOLOGY, INC., Kent, WA (US)

( * ) Notice: Subject to any disclaimer, the term of this patent is extended or adjusted under 35 U.S.C. 154(b) by 26 days.

(21) Appl. No.: 15/415,469

(22) Filed: Jan. 25, 2017

(65) Prior Publication Data

US 2017/0129599 A1  May 11, 2017

Related U.S. Application Data

(62) Division of application No. 14/858,080, filed on Sep. 18, 2015, now Pat. No. 9,586,681, which is a division
(Continued)

(51) Int. Cl.
*B64C 27/68* (2006.01)
*B64C 13/18* (2006.01)
(Continued)

(52) U.S. Cl.
CPC ............. *B64C 27/68* (2013.01); *B64C 13/18* (2013.01); *B64C 13/30* (2013.01); *B64C 27/57* (2013.01)

(58) Field of Classification Search
CPC .................................................. B64C 27/68
(Continued)

(56) References Cited

U.S. PATENT DOCUMENTS 2,923,503 A   2/1960   Vogel
3,058,697 A   10/1962  Tribken
(Continued)

FOREIGN PATENT DOCUMENTS

EP   0313470 A1   4/1989
EP   1840861 A2   10/2007
(Continued)

OTHER PUBLICATIONS

The International Search Report and the Written Opinion of the International Searching Authority for International Application No. PCT/US2013/025458 which is associated with U.S. Appl. No. 13/763,590, dated Dec. 5, 2013, Moscow, Russia.
(Continued)

*Primary Examiner* — David S Luo
(74) *Attorney, Agent, or Firm* — Pritzkau Patent Group LLC

(57) ABSTRACT

An autopilot actuator includes first and second motors each including a rotatable motor output shaft such that either one or both of the motors can drive an actuator output shaft. An autopilot main unit enclosure is removably mounted to the helicopter proximate to a cyclic control and commonly houses autopilot actuators as well as main autopilot electronics. A cyclic vibration isolator is removably supported by an actuator shaft for co-rotation and coupled to the cyclic control to attenuate a cyclic vibration frequency at the actuator shaft while output rotations of the actuator shaft below a resonant frequency are coupled to the cyclic control. A force limited link includes first and second ends and a variable length between. The force limited link having a relaxed length when less than an unseating force is applied and the variable length changes when an applied force exceeds the unseating force to permit pilot override.

12 Claims, 14 Drawing Sheets

Related U.S. Application Data of application No. 13/763,590, filed on Feb. 8, 2013, now Pat. No. 9,150,308.

(60) Provisional application No. 61/597,581, filed on Feb. 10, 2012, provisional application No. 61/597,570, filed on Feb. 10, 2012, provisional application No. 61/597,555, filed on Feb. 10, 2012.

(51) Int. Cl.
*B64C 27/57* (2006.01)
*B64C 13/30* (2006.01)

(58) Field of Classification Search
USPC ........................................................ 318/3, 34
See application file for complete search history.

(56) References Cited

U.S. PATENT DOCUMENTS

| | | |
|---|---|---|
| 3,198,922 A | 8/1965 | Etienne |
| 3,679,956 A | 7/1972 | Redmond |
| 4,003,532 A | 1/1977 | Adams, Sr. et al. |
| 4,005,835 A | 2/1977 | Gerstine |
| 4,029,271 A | 6/1977 | Murphy |
| 4,034,605 A | 7/1977 | Green |
| 4,091,244 A | 5/1978 | Chu et al. |
| 4,279,391 A | 7/1981 | Adams et al. |
| 4,371,937 A | 2/1983 | Adams et al. |
| 4,426,607 A | 1/1984 | Black |
| 4,580,223 A | 4/1986 | Wright |
| 4,584,510 A | 4/1986 | Hollow |
| 4,603,389 A | 7/1986 | Griffith |
| 4,628,455 A | 12/1986 | Skutecki |
| 4,739,128 A | 4/1988 | Grisham |
| 4,763,285 A | 8/1988 | Moore et al. |
| 4,965,879 A | 10/1990 | Fischer, Jr. |
| 5,195,700 A | 3/1993 | Fogler et al. |
| 5,204,605 A | 4/1993 | Delattre et al. |
| 5,299,759 A | 4/1994 | Sherman et al. |
| 5,522,568 A | 6/1996 | Kamen et al. |
| 5,694,014 A | 12/1997 | Hegg et al. |
| 5,793,356 A | 8/1998 | Svancarek et al. |
| 6,038,498 A | 3/2000 | Briffe et al. |
| 6,092,919 A | 7/2000 | Calise |
| 6,119,834 A | 9/2000 | Lee |
| 6,314,343 B1 | 11/2001 | Adams et al. |
| 6,325,331 B1 | 12/2001 | McKeown |
| 6,580,418 B1 | 6/2003 | Grome et al. |
| 6,697,758 B2 | 2/2004 | McCall et al. |
| 7,305,286 B1 | 12/2007 | Younkin et al. |
| 7,568,662 B1 | 8/2009 | Conner |
| 7,624,943 B2 | 12/2009 | Cerchie et al. |
| 7,954,614 B2 | 6/2011 | Mercer |
| 7,976,310 B2 | 7/2011 | Bachelder et al. |
| 8,134,328 B2 | 3/2012 | Hanlon et al. |
| 8,195,346 B1 | 6/2012 | Duerksen |
| 8,342,455 B2 | 1/2013 | Allieta et al. |
| 8,360,369 B2 | 1/2013 | Mercer et al. |
| 8,473,124 B2 * | 6/2013 | Shue ..................... G05D 1/101 700/29 |
| 8,886,370 B2 | 11/2014 | Carlavan |
| 8,948,936 B2 | 2/2015 | Shue et al. |
| 9,304,516 B2 | 4/2016 | Christensen |
| 2002/0030142 A1 | 3/2002 | James |
| 2005/0173595 A1 | 8/2005 | Hoh |
| 2006/0058928 A1 | 3/2006 | Beard et al. |
| 2007/0164167 A1 | 7/2007 | Bachelder et al. |
| 2007/0164168 A1 | 7/2007 | Hirvonen et al. |
| 2007/0182590 A1 | 8/2007 | Younkin |
| 2007/0221782 A1 | 9/2007 | Cerchie et al. |
| 2008/0036617 A1 | 2/2008 | Arms et al. |
| 2008/0294305 A1 | 11/2008 | Roesch |
| 2010/0076625 A1 | 3/2010 | Yoeli |
| 2010/0123045 A1 | 5/2010 | Grieser |
| 2010/0210391 A1 | 8/2010 | Dinger |
| 2011/0022250 A1 | 1/2011 | Hamburg |
| 2011/0031346 A1 | 2/2011 | Allieta et al. |
| 2011/0046824 A1 | 2/2011 | Antraygue |
| 2011/0121126 A1 | 5/2011 | Mercer et al. |
| 2011/0137492 A1 | 6/2011 | Sahasrabudhe et al. |
| 2011/0190964 A1 | 8/2011 | Petillon |
| 2011/0276202 A1 | 11/2011 | Carlavan et al. |
| 2012/0068004 A1 | 3/2012 | Hatamian |
| 2012/0097800 A1 | 4/2012 | Burroughs et al. |
| 2012/0277933 A1 | 11/2012 | Krogh et al. |
| 2012/0286088 A1 | 11/2012 | Mercer et al. |
| 2013/0261853 A1 | 10/2013 | Shue |
| 2014/0027564 A1 | 1/2014 | Mercer et al. |
| 2014/0027565 A1 | 1/2014 | Marvin et al. |
| 2014/0244078 A1 | 8/2014 | Downey |

FOREIGN PATENT DOCUMENTS

| | | |
|---|---|---|
| EP | 1996459 B1 | 12/2008 |
| RU | 8813 U1 | 12/1998 |
| RU | 2282562 C1 | 8/2006 |
| RU | 2369907 C2 | 10/2009 |
| TW | 479131 B | 3/2002 |
| WO | 2008/065664 A2 | 6/2008 |
| WO | 2009/130576 A1 | 10/2009 |

OTHER PUBLICATIONS

Thai Technics.Com, Flight Direction Control, Apr. 30, 2001, Retrieved from the Internet: <URL:http://www.thaitechnics.com/helicopter/heli_control_3.html.>.

Paul G. Savage, Strapdown Inertial Navigation Integration Algorithm Design Part 1: Attitude Algorithms, Jan.-Feb. 1998, Journal of Guidance, Control, and Dynamics, vol. 21, No. 1.

Paul G. Savage, Strapdown Inertial Navigation Integration Algorithm Design Part 2: Velocity and Position Algorithms, Mar.-Apr. 1998, Journal of Guidance, Control, and Dynamics, vol. 21, No. 2.

William Premerlani, Robust Estimator of the Direction Cosine Matrix, Feb. 22, 2009, http://diydrones.com/forum/topics/robust-estimator-of-the.

William Premerlani, Wind Estimation without an Airspeed Sensor, Jan. 29, 2010, http://diydrones.com, UAV Dev Board.

William Premerlani and Paul Bizard, Direction Cosine Matrix IMU: Theory, May 17, 2009, http://diydrones.com.

The International Preliminary Report on Patentability for International Application No. PCT/US2013/025456 which is associated with U.S. Appl. No. 13/763,574, dated Jun. 16, 2014, Alexandria, Virginia.

The International Preliminary Report on Patentability for International Application No. PCT/US2013/025458 which is associated with U.S. Appl. No. 13/763,590, dated Aug. 12, 2014, Geneva, Switzerland.

The International Search Report and the Written Opinion of the International Searching Authority for International Application No. PCT/US2013/025456 which is associated with U.S. Appl. No. 13/763,574, dated Dec. 5, 2013, Moscow, Russia.

The International Search Report and the Written Opinion of the International Searching Authority for International Application No. PCT/US2013/025452 which is associated with U.S. Appl. No. 13/763,582, dated May 16, 2013, Moscow, Russia.

Office Action dated Aug. 12, 2014 for co-pending U.S. Appl. No. 13/763,582, filed Feb. 8, 2013.

Shawn Coyle, Nov. 7, 2011, "Understanding Your Autopilot", http://www.verticalmag.com/news/article/understanding-your-autopilot-pt-3.html.

Extended European Search Report for International Application No. PCT/US2013/025458 which is associated with U.S. Appl. No. 13/763,590, dated Sep. 2, 2015, Munich, Germany.

The First Office Action of the the State Intellectual Property Office of People's Republic of China for Chinese Application No. 201380007952.X which is associated with International Application No. PCT/US2013/025458 which is associated with U.S. Appl. No. 13/763,590, dated Aug. 4, 2015. (Machine translation included).

(56) References Cited

OTHER PUBLICATIONS

Written Opinion of the International Preliminary Examining Authority for International Application No. PCT/US2013/025452 which is associated with U.S. Appl. No. 13/763,582, dated Jan. 15, 2015, Alexandria, VA.
Applicant Response to the Jan. 15, 2015 Written Opinion of the International Preliminary Examining Authority for International Application No. PCT/US2013/025452 which is associated with U.S. Appl. No. 13/763,582, dated Feb. 13, 2015, Los Angeles, CA.
The First Office Action of the State Intellectual Property Office of People's Republic of China for Chinese Application No. 201380008002.9 which is associated with International Application No. PCT/US2013/025456 which is associated with U.S. Appl. No. 13/763,574, dated Feb. 14, 2016.
The Second Office Action of the State Intellectual Property Office of People's Republic of China for Chinese Application No. 201380007952.X which is associated with International Application No. PCT/US2013/025458 which is associated with U.S. Appl. No. 13/763,590, dated Mar. 9, 2016.
Extended European Search Report for European Application No. 13787117.4 which is associated with International Application No. PCT/US2013/025456 which is associated with U.S. Appl. No. 13/763,574, dated Jun. 6, 2016, Munich, Germany.
The First Office Action of the State Intellectual Property Office of People's Republic of China for Chinese Application No. 201380007947.9 which is associated with International Application No. PCT/US2013/025452 which is associated with U.S. Appl. No. 13/763,582, dated May 11, 2016.
Partial Supplementary European Search Report for European Application No. 13746980.6 which is associated with International Application No. PCT/US2013/025452 which is associated with U.S. Appl. No. 13/763,582, dated Jun. 29, 2016, Munich, Germany.
The Third Office Action of the State Intellectual Property Office of People's Republic of China for Chinese Application No. 201380007952.X which is associated with International Application No. PCT/US2013/025458 which is associated with U.S. Appl. No. 13/763,590, dated Jul. 28, 2016.
The Second Office Action of the the State Intellectual Property Office of People's Republic of China for Chinese Application No. 2013800080029 which is associated with International Application No. PCT/US2013/025456 which is associated with U.S. Appl. No. 13/763,574, dated Sep. 26, 2016. (Machine translation included).
Extended European Search Report for European Application No. 13746908.6 which is associated with International Application No. PCT/US2013/025452 which is associated with U.S. Appl. No. 13/763,582, dated Oct. 4, 2016, Munich, Germany.
The First Office Action of the European Patent Office for European Application No. 13790956.0 which is associated with International Application No. PCT/US2013/025458 which is associated with U.S. Appl. No. 13/763,590, dated Sep. 15, 2016.
The Third Office Action of the State Intellectual Property Office of People's Republic of China for Chinese Application No. 201380008002.9 which is associated with International Application No. PCT/US2013/025456 which is associated with U.S. Appl. No. 13/763,574, dated Feb. 13, 2017. (Machine translation included).
The Second Office Action of the State Intellectual Property Office of People's Republic of China for Chinese Application No. 201380007947.9 which is associated with International Application No. PCT/US2013/025452 which is associated with U.S. Appl. No. 13/763,582, dated Mar. 3, 2017. (Machine translation included).
The First Office Action of the Russian Federation for Russian Application No. 2014131912 which is associated with International Application No. PCT/US2013/025458 which is associated with U.S. Appl. No. 13/763,590, dated Mar. 14, 2017. (Machine translation included).
The Second Office Action of the European Patent Office for European Application No. 13790956.0 which is associated with International Application No. PCT/US2013/025458 which is associated with U.S. Appl. No. 13/763,590, dated Dec. 14, 2017.
The Third Office Action of the State Intellectual Property Office of People's Republic of China for Chinese Application No. 201380007947.9 which is associated with International Application No. PCT/US2013/025452 which is associated with U.S. Appl. No. 13/763,582, dated Feb. 8, 2018. (Machine translation included).
The Second Office Action of the Russian Federation for Russian Application No. 2014131912 which is associated with International Application No. PCT/US2013/025458 which is associated with U.S. Appl. No. 13/763,590, dated Jul. 11, 2017.
English translation of the previously cited reference: The Third Office Action of the State Intellectual Property Office of People's Republic of China for Chinese Application No. 201380007947.9 which is associated with International Application No. PCT/US2013/025452 which is associated with U.S. Appl. No. 13/763,582, Received Mar. 5, 2018.

\* cited by examiner

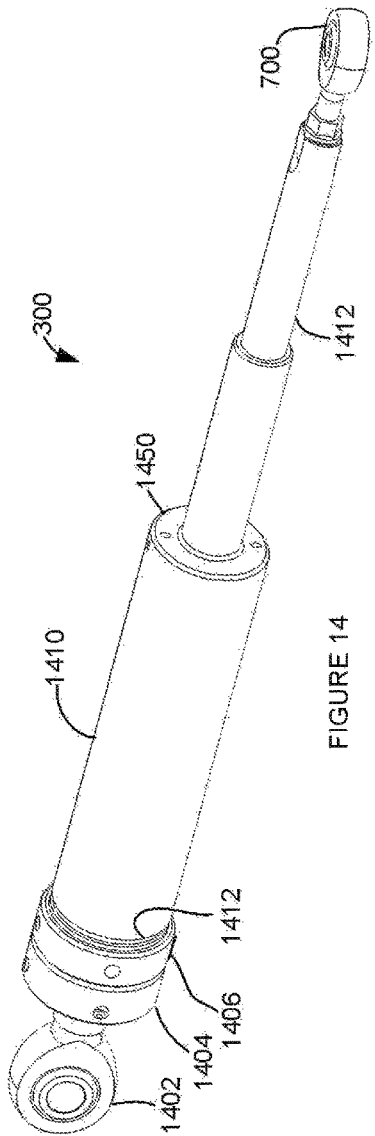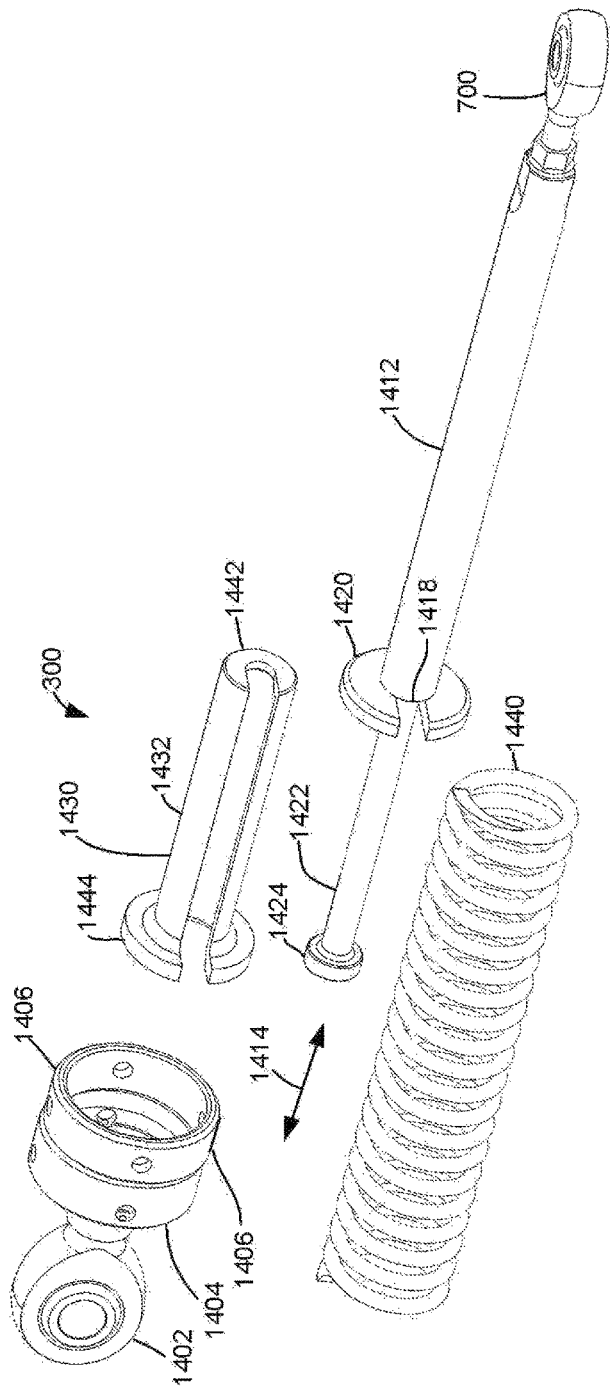

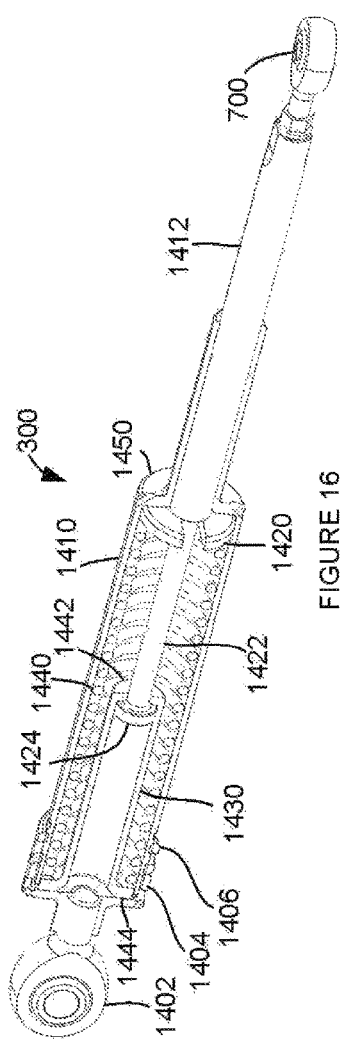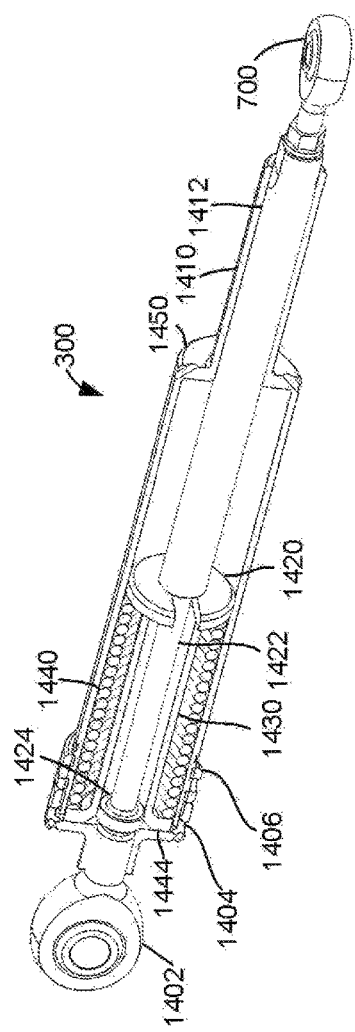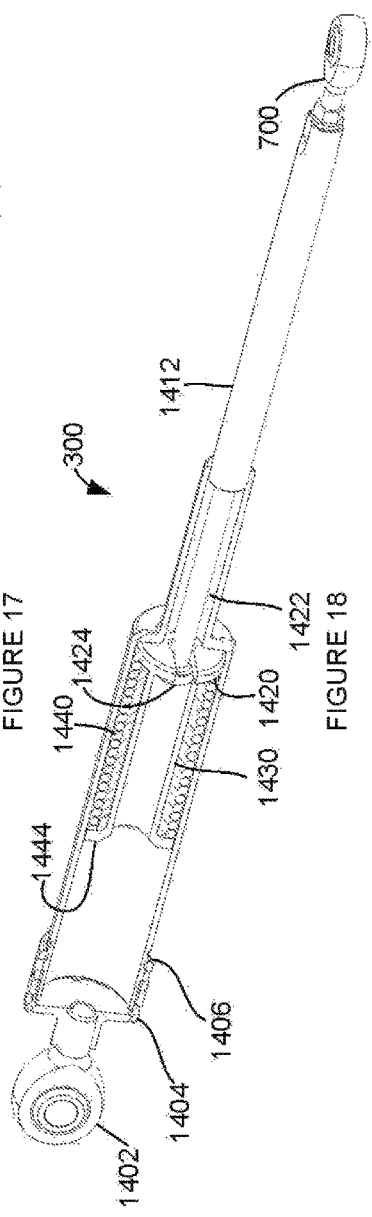

ROTORCRAFT AUTOPILOT SYSTEM, COMPONENTS AND METHODS

RELATED APPLICATIONS

This application is a divisional application of copending U.S. patent application Ser. No. 14/858,080 filed on Sep. 18, 2015; which is a divisional application of U.S. patent application Ser. No. 13/763,590 filed on Feb. 8, 2013 and issued as U.S. Pat. No. 9,150,308 on Oct. 6, 2015; which claims priority from U.S. Provisional Patent Application Ser. No. 61/597,555; U.S. Provisional Patent Application Ser. No. 61/597,570; and U.S. Provisional Patent Application Ser. No. 61/597,581, each of which was filed on Feb. 10, 2012, and all of which are hereby incorporated by reference in their entirety.

BACKGROUND

The present application is generally related to flight control systems and, more particularly, to a rotorcraft autopilot and associated methods.

A helicopter is inherently unstable, generally requiring that the pilot maintain a constant interaction with the cyclic control using one hand. Even a momentary release of the cyclic can result in the cyclic or control stick "flopping over", accompanied by a loss of control of the helicopter. This is particularly inconvenient when the pilot has a need to engage in hands-free activities such as, for example, adjusting a headset or referring to a hardcopy of a map. Further, the need to constantly control the cyclic can result in pilot fatigue.

Traditional autopilots can provide benefits which include allowing the pilot release the cyclic to engage in hands-free tasks, as well as reducing pilot fatigue. Applicants recognize, however, that the cost of a traditional helicopter autopilot can be prohibitive. For example, the cost can be so significant in comparison to the cost of the helicopter itself that autopilots are uncommon in light helicopters.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Generally, an autopilot system for a helicopter associated components and methods are described. In one aspect of the disclosure and as part of an autopilot for providing automatic control of a helicopter by actuating one or more flight controls, an actuator is configured to include a redundant pair of first and second motors each including a rotatable motor output shaft. A gear arrangement includes an actuator output shaft for operative coupling to the flight controls and is configured to engage the output shaft of each one of the first and second motors for operation at least in (i) a first mode in which both the first and second motors contribute to rotation of the actuator output shaft, (ii) a second mode in which first motor rotates the actuator output shaft due to a failure of the second motor and (iii) a third mode in which the second motor rotates the output shaft due to a failure of the first motor.

In another aspect of the disclosure, an autopilot display unit is mounted in an instrument console of the helicopter at least for displaying autopilot flight data to a pilot of the helicopter. An autopilot main unit enclosure is removably mounted to the helicopter proximate to a cyclic control of the helicopter and which defines a main unit interior. A set of actuators is supported within the main unit interior including a pitch actuator having a pitch actuator output shaft and a roll actuator having a roll actuator output shaft such that no more than the pitch actuator shaft and the roll actuator shaft of the set of actuators extend at least partially outward from the autopilot main unit enclosure for providing mechanical control forces to the cyclic control of the helicopter. A main unit electronics section is supported within the main unit interior and is in electrical communication with the autopilot display unit and with the set of actuators for providing electrical control signals to the actuators such that the main unit electronics section and the set of actuators are commonly housed within the main unit interior.

In still another aspect of the disclosure, an autopilot system is configured for automated control of a helicopter by actuating a cyclic control of the helicopter which cyclic control is subject to a cyclic vibration frequency responsive to rotation of a rotor of the helicopter. A cyclic vibration isolator is removably supported by the actuator shaft for co-rotation therewith and coupled to the cyclic control of the helicopter to exhibit a resonant frequency that is at least approximately matched to the cyclic vibration frequency for movement of the cyclic control relative to the actuator shaft such that the cyclic vibration frequency is attenuated at the actuator shaft and output rotations of the actuator shaft below the resonant frequency are coupled to the cyclic control.

In yet another aspect of the disclosure, an autopilot system is configured for automated control of a helicopter by actuating a cyclic control of the helicopter which cyclic control is subject to a cyclic vibration responsive to rotation of a rotor of the helicopter. A cyclic vibration isolator includes a control arm that is removably attached to the actuator shaft to support the cyclic vibration isolator such that the control arm co-rotates with the actuator shaft. An output arm is coupled to the cyclic control of the helicopter and therefore subject to the cyclic vibration. A resilient arrangement is captured between the control arm and the output arm such that the output arm oscillates responsive to the cyclic vibration and relative to the control arm to mechanically isolate the actuator shaft from the cyclic vibration while transferring rotational actuation motions of the actuator shaft to the output arm to thereby transfer the rotational actuation motions to the cyclic control for autopilot actuation of the cyclic control.

In a continuing aspect of the disclosure, an autopilot system is configured for automated control of a helicopter by driving an actuator having an actuator shaft to actuate a cyclic control of the helicopter. As part of the autopilot, a force limited link includes a first end, a second end and a variable length therebetween oriented along an elongation axis with the first end coupled to the actuator shaft and the second end coupled to the cyclic control. The force limited link having a relaxed length as the variable length between the first and second ends when less than an unseating force is applied to the first and second ends along the elongation axis to provide compliant movement of the cyclic control responsive to the actuator and configured such that the variable length changes from the relaxed length responsive to an external force that is applied to the first and second ends along the elongation axis which is equal to or greater than the unseating force to provide for a pilot override of actuator cyclic control.

In a further aspect of the disclosure, an autopilot system is configured for automated control of a helicopter by providing electrical command signals to an actuator to actuate a cyclic control of the helicopter which cyclic control is subject to a cyclic vibration responsive to rotation of a rotor of the helicopter. An autopilot linkage includes a force limited link to provide a pilot override of cyclic control by the actuator. The force limited link having a first end, a second end and a variable length therebetween oriented along an elongation axis with the first end coupled to the cyclic control. The force limited link having a relaxed length as the variable length between the first and second ends when less than an unseating force is applied to the first and second ends along the elongation axis to provide compliant movement of the second end with the first end and configured such that the variable length changes from the relaxed length responsive to an external force that is applied to the first and second ends along the elongation axis which is equal to or greater than the unseating force for pilot override. A cyclic vibration isolator is removably supported by the actuator shaft for co-rotation therewith and connected to the second end of the force limited link such that the cyclic vibration is coupled to the cyclic vibration isolator by the force limited link and the cyclic vibration isolator is configured to exhibit a resonant frequency that is at least approximately matched to a cyclic vibration frequency of the cyclic vibration to allow movement of the second end of the force limited link relative to the actuator shaft at the cyclic vibration frequency while isolating the actuator shaft from the cyclic vibration frequency and for transferring output rotations of the actuator shaft below the resonant frequency to the force limited link for transfer to the cyclic control.

BRIEF DESCRIPTION OF THE DRAWINGS

Embodiments are illustrated in referenced figures of the drawings. It is intended that the embodiments and figures disclosed herein are to be illustrative rather than limiting.

FIG. 14 is a diagrammatic view, in perspective, of an embodiment of a force limited link of the present disclosure.

FIG. 15 is a diagrammatic, exploded view in perspective of the force limited link of FIG. 14.

FIGS. 16-18 are diagrammatic, cutaway views, in perspective, of the force limited link of FIGS. 14 shown in respective ones of relaxed, compressed and extended operational states.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiments shown, but is to be accorded the widest scope consistent with the principles and features described herein including modifications and equivalents. It is noted that the drawings may not be to scale and may be diagrammatic in nature in a way that is thought to best illustrate features of interest. Descriptive terminology may be adopted for purposes of enhancing the reader's understanding, with respect to the various views provided in the figures, and is in no way intended as being limiting.

Figure 1:
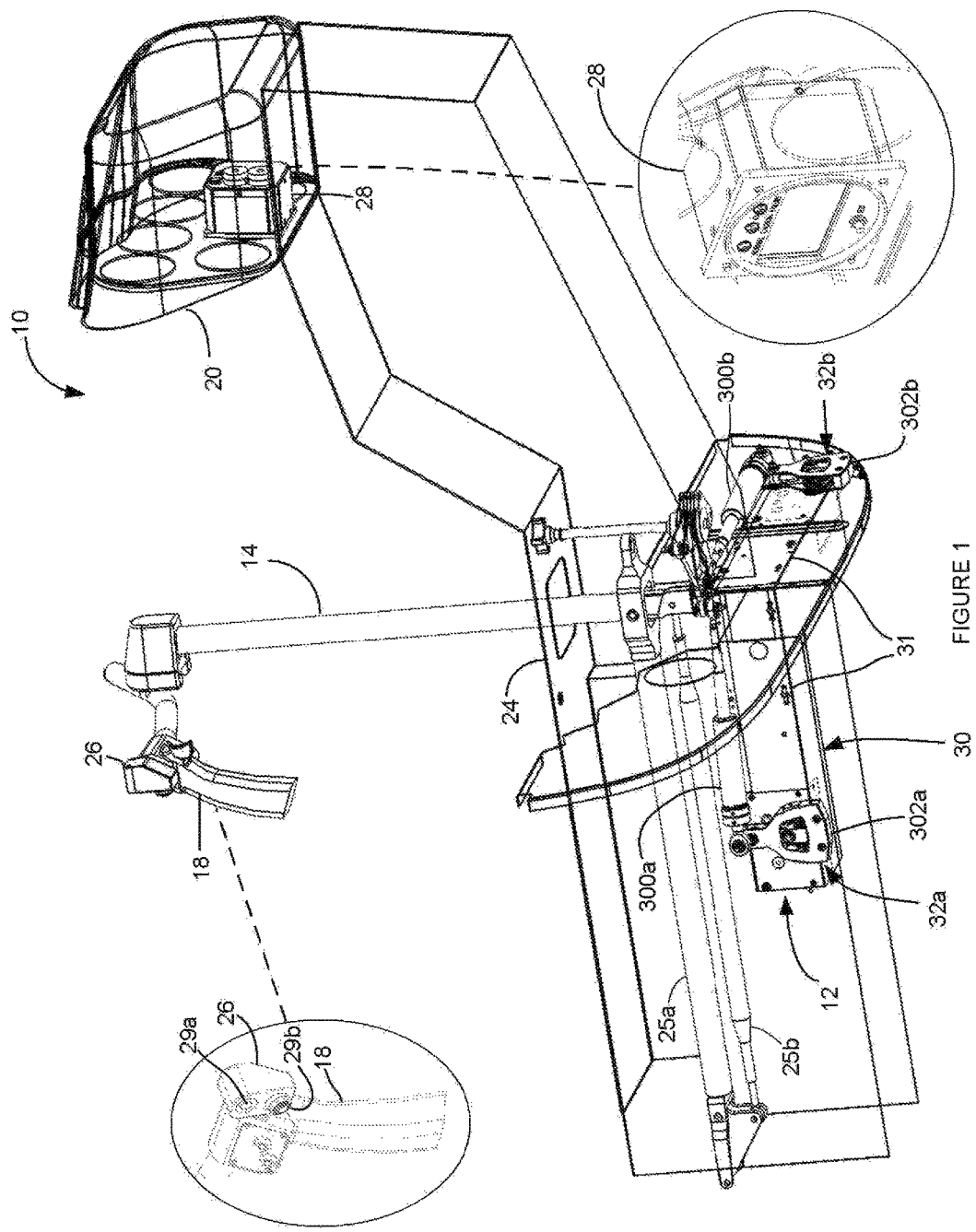
FIG. 1 is a diagrammatic perspective, partial view of a helicopter including components of an autopilot according to the present disclosure.

FIG. 1 is a perspective, partial view of a helicopter 10, shown here for purposes of illustrating various components of an embodiment of an autopilot system 12 in relation to the helicopter. It should be appreciated that much of the physical structure of the helicopter itself has been rendered as invisible in FIG. 1 for purposes of illustrative clarity, however, it is understood that this structure is present. The autopilot of the present disclosure is electromechanical and can provide flight control of a helicopter without requiring a hydraulic flight control system. The helicopter can be, by way of non-limiting example, a Robinson R22 helicopter. The teachings that are brought to light herein, however, can readily be adapted for use with any suitable helicopter, either currently available or yet to be developed. For example, the autopilot of the present disclosure can be used with helicopters having hydraulic cyclic assistance, with or without the hydraulics functioning.

Helicopter 10 includes a stick or cyclic 14 having a control handle or grip 18 that is configured for engagement with the hand of a pilot. As will be appreciated by one of ordinary skill in the art, stick 14 can be moved fore and aft (toward and away from an instrument console 20) to control pitch of the helicopter and transversely for purposes of controlling roll of the helicopter in a coordinated manner to produce controlled flight. Additional control inputs are provided by the pilot via a pair of pedals in order to control the yaw orientation of the helicopter by changing the pitch of a tail rotor. It is noted that these yaw orientation control components have not been shown for purposes of illustrative clarity but are understood to be present. In an embodiment, the pilot also remains in control of the collective of the helicopter as well as the throttle settings. The autopilot of the present disclosure, however, can exert full control authority over stick 14 by moving the stick in any direction to the limits of its travel under appropriate circumstances. Stick 14 passes below a deck 24 of the helicopter and engages pitch and roll linkages of the helicopter in a manner that is familiar to one of ordinary skill in the art so as to control cyclic actuation of the main rotor of the helicopter. In particular, a torque tube 25a transfers roll actuations while a control rod 25b transfers pitch actuations. The term "cyclic" refers to the variation in pitch of the rotor blades of the helicopter on a per revolution basis. In this regard, cyclic control can refer to manipulation of the stick or the stick itself can be referred to as the cyclic. An autopilot display processor unit (ADPU) 28 can be mounted in instrument console 20 to provide indications to the pilot as well as to provide processing capability and other capabilities. It is noted that the ADPU is also shown in a further enlarged, inset view.

The cyclic, in particular, handle 18 includes a Switch Module Assembly 26 that can be mounted as shown. Details of handle 18 are shown in a further enlarged inset view. The switch module can contain switches including an engage/disengage switch 29a and a trim/mode "top-hat" switch 29b (4-way, in the present embodiment). The top-hat switch allows the pilot to trim the course, speed and altitude. There can be a time-out feature in the autopilot processor which prevents switch faults or wiring faults from causing continuous trimming. The mode switch can select and deselect altitude, speed, hover or position hold modes based on current flight conditions.

Still referring to FIG. 1, autopilot 12 implements cyclic control through a number of component assemblies that are appropriately located on the helicopter. A main autopilot unit 30 is located below the main deck of the helicopter. In the present embodiment, main unit 30 includes an L-shaped enclosure 31 that supports electronics as well as a pitch control linkage 32a and a roll control linkage 32b, which may be referred to generally or collectively by the reference number 32. Each of these linkages includes an actuator that is located within the main unit enclosure, as will be further described. A distal end of each of the linkages engages the lowermost end of stick 14 to implement what is known as a parallel control system. In this regard, it should be appreciated that the original cyclic control linkages of helicopter 10 between stick 14 and the rotor remain intact. That is, inputs from the helicopter pilot as well as the autopilot are input directly to the stick. Details with respect to the pitch and roll control linkages provide for a parallel control input arrangement. A series type autopilot control system, in contrast, requires breaking the original cyclic control linkages of the helicopter between the stick and rotor such that the autopilot actuators can be inserted into the break. It should be appreciated that the teachings herein can readily be adapted to a series control input embodiment.

Figure 2:
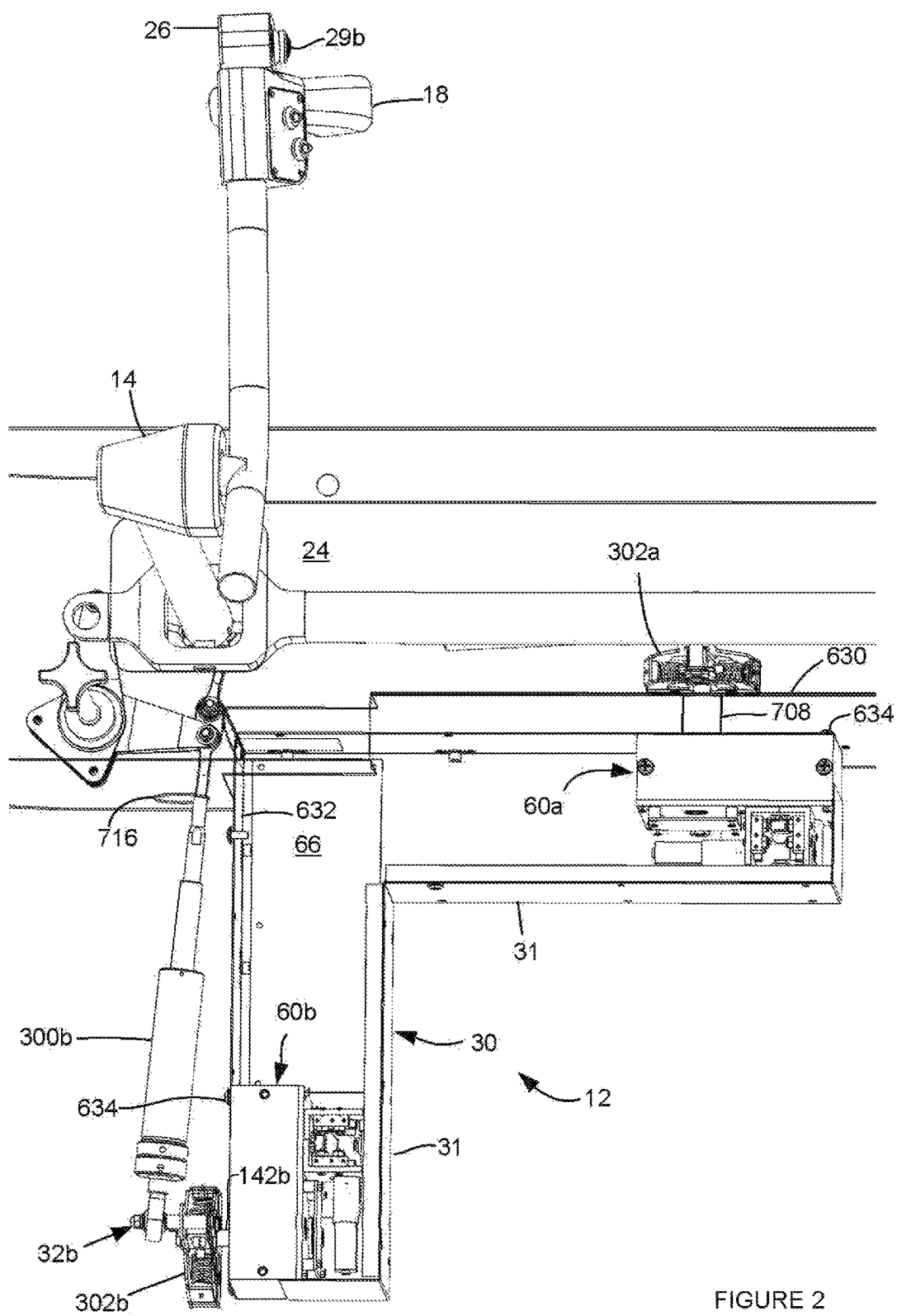
FIG. 2 is an overhead diagrammatic perspective, partial view of the helicopter of FIG. 1, shown here to illustrate further details with respect to components of the autopilot system.

Turning to FIG. 2, components of the helicopter and autopilot are shown in an overhead perspective view. In this view, a pitch actuator 60a and a roll actuator 60b (which may be referred to generally or collectively by the reference number 60) can be seen within L-shaped enclosure 31 with the lid of the enclosure rendered transparent. Main unit electronics 66 are located within the enclosure and are suitably electrically interfaced (not shown) both externally and to the actuators. It is noted that additional details with respect to a suitable embodiment of main unit electronics 66 have been described in copending U.S. patent application Ser. No. 13/763,574, which is incorporated herein by reference in its entirety.

Figure 3:
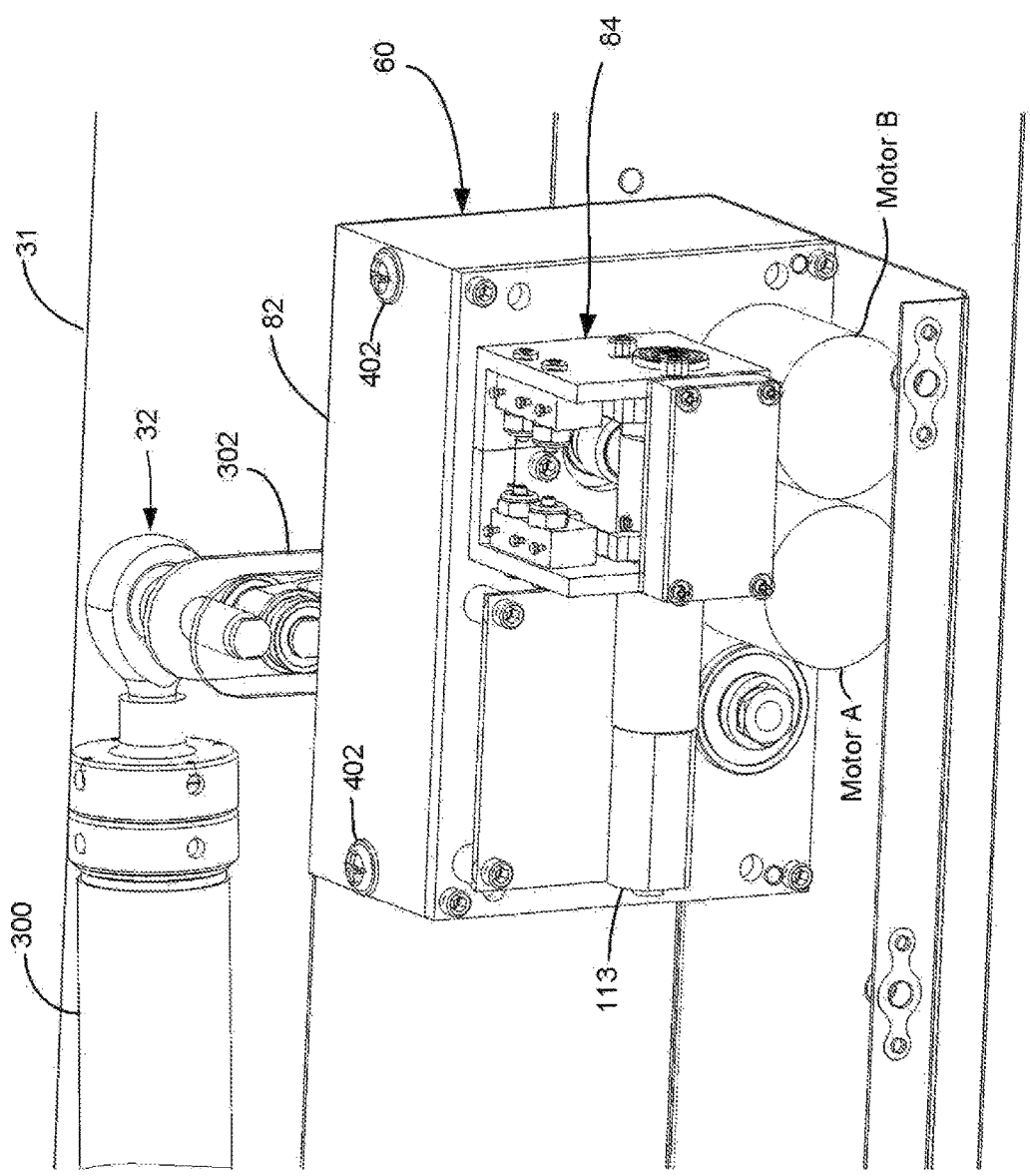
FIG. 3 is a diagrammatic, perspective partial view of an embodiment of an actuator and an embodiment of a force limited link that can serve as components of the autopilot of the present disclosure.

Referring to FIG. 3, an embodiment of actuator 60 that can be used for the pitch and roll actuators throughout this disclosure is seen in a perspective view installed within enclosure 31 and connected to a control linkage 32. Each actuator includes a housing 82 having a gear arrangement, yet to be illustrated, within the housing, dual motors Motor A and Motor B, and a clutch arrangement 84 for selectively engaging and disengaging the motors to rotate an output shaft which is not visible on the opposite side of housing 82. The latter can be formed, for example, from stainless steel. As will be seen, the gear arrangement allows motors A and B to simultaneously drive the output shaft or either one of the motors to individually drive the output shaft. In the present embodiment, motors A and B are brushless DC motors having a Y stator winding configuration which requires coordinated inputs to drive the motor phases in a particular sequence that is well-known. As such, the motors cannot runaway under their own power. The motors include Hall effect sensors that are used for purposes of timing electrical drive pulses to the stator of the motor. Further details with respect to the motors and related drive considerations are provided at one or more appropriate points hereinafter.

Figure 4:
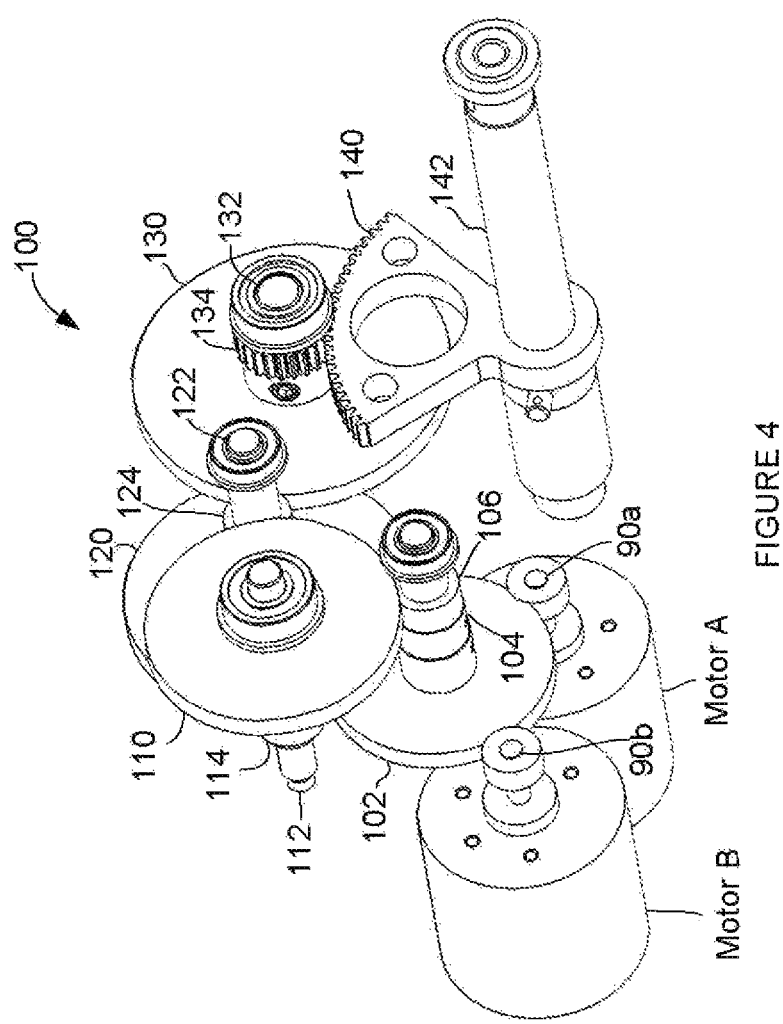
FIG. 4 is a diagrammatic, perspective view of an embodiment of a gear drive arrangement that can form part of the actuator of FIG. 3 along with a redundant pair of actuator drive motors.

FIG. 4 illustrates an embodiment of a gear drive arrangement 100 that can be used in the actuator of FIG. 3. Initially, it is noted that the gear drive arrangement is a multi-stage reduction drive, for example, on the order of about 1750:1. Also, teeth have not been illustrated on a number of the gears to be described, but are understood to be present. Other embodiments may not require gears with teeth. Motors A and B have output shafts 90a and 90b, respectively, supporting gears that engage a gear 102 on a first shaft 104. An opposing end of shaft 104 supports a smaller gear 106 that drives a gear 110 that is supported on a second shaft 112 which also supports a smaller gear 114 (partially hidden in the view of the figure). It is noted that shaft 112 can comprise a clutch shaft that can move laterally to selectively engage or disengage the actuator motors from the remaining gears of the gear drive. A suitable clutch arrangement is described, for example, in U.S. Pat. No. 7,954,614 which is incorporated by reference. The clutch arrangement relies upon movement of the clutch shaft along its elongation axis by using a permanent magnet that is mounted on a distal end of the shaft. Clutch actuator 113 (FIG. 3) can selectively move (for example, rotate) another permanent magnet in relation to the clutch shaft mounted permanent magnet such that the clutch shaft is magnetically biased to move between an engaged position and a disengaged position. The clutch shaft remains in a current operational position despite a power failure. Gear 114, in turn, selectively drives a gear 120 that is supported on a third shaft 122. The latter also supports a smaller gear 124 that drives a gear 130 that is supported on a forth shaft 132. The forth shaft, in turn, supports a smaller gear 134 which is arranged to rotate an output gear 140 that is supported on an output shaft 142 of the actuator. The output gear is configured to provide sufficient rotation to move stick 14 through its full range of motion. In an embodiment, the actuators of the present disclosure are sufficiently robust, in terms of the generated level of actuation force, so as to be capable of controlling the cyclic of a hydraulically equipped helicopter using a failed hydraulic system. For example, actuator 60 is capable of applying forces of at least 100 pounds to the cyclic. While the present embodiment has been designed to provide actuation forces at this level using an available output torque of up to 200 inch-pounds, it should be appreciated that in another embodiment, significantly higher force can be provided, for example, by reducing the length of the actuator control arm. As will be further described, the actuator forces are applied to the bottom of the cyclic whereas pilot forces are applied to the top of the cyclic. Accordingly, the pilot is provided with a mechanical advantage due to the different lever-arm lengths. On the R22 helicopter, the mechanical advantage that the pilot has at the top of the stick compared to the bottom of the stick where the actuators are attached is roughly 7:1. In such a case, an actuator applied force of 100 pounds is equivalent to about 14 pounds of pilot applied force. Similarly, while the actuator can generate very large forces, the force-limited link that is described below generally will not be embodied to transmit forces of such a magnitude through to the base of the cyclic, however, a much stiffer force-limited link embodiment can be installed, if so desired.

In an embodiment, the actuator can be configured with a gear ratio of approximately 1720:1, however, a wide range of different gear ratios may be found to be suitable. It should be appreciated that for a gear ratio of 1720:1, one revolution of the motor rotates the actuator output shaft by only about 0.2 degrees. In and by itself, this resolution can be sufficient for monitoring the actuator output position. For example, rotation of the motor shaft can be detected using a magnet that is mounted on the shaft, as is familiar to one having ordinary skill in the art. In an embodiment, as described in the above incorporated U.S. patent application Ser. No. 13/763,574, Hall sensor data from the motors can be used to determine the incremental position of the actuator output shaft of each actuator. In this regard, each actuator motor includes 3 Hall sensors. The Hall sensor pulses can act like an incremental up/down counter. The position of the output shaft relative to a reference location can be tracked constantly. For example, a zero reference position of the actuator output shaft can be defined when the actuator is engaged via clutch 84. Such zero reference position tracking can be used for certain failures wherein the best approach resides in restoring the actuator arms/shafts to their averaged positions prior to the failure. Since each motor includes 3 Hall sensors and 4 poles, there are 12 Hall state changes per revolution of each motor. Remarkably, by monitoring the Hall state changes, resolution can be increased by a factor of 12 such that a resolution of about 0.017 degrees is provided at the output shaft of the actuator. In an embodiment, a corresponding movement at the top of the stick in FIG. 1 can be about 0.0039 inch.

A total power failure of the helicopter's electrical power system can cause the actuators to lock in position for about five seconds using a dynamic braking feature that is described in the above incorporated U.S. patent application Ser. No. 13/763,574. This five second time period is generally more than sufficient for the pilot to take over control. In this regard, regulatory requirements mandate a time period of only three seconds. In this regard, the autopilot does not let the cyclic stick flop over by releasing control responsive to a power failure. Even with both actuators locked, the pilot can still perform control over the helicopter since there are override or force limited links 300*a* (pitch, seen in FIGS. 1) and 300*b* (roll, seen in FIGS. 1 and 2) between each actuator and the cyclic stick. These links are rigid for forces below an unseating value and compliant at higher forces to allow the pilot to safely maneuver and land the helicopter even if disengagement of the system cannot be achieved. It has been empirically demonstrated that a pilot can control the helicopter, including hovering and landing, with both actuators in what is referred to as a "locked" state. The locked state is provided by shorting all windings of the actuator motors and is used in the dynamic braking embodiment described above. The override links are described in detail below and may be referred to interchangeably as force-limited links. In a helicopter that does not utilize a hydraulic interface to the cyclic, cyclic vibration isolators 302*a* (pitch) and 302*b* (roll) can be located on the output shaft of each actuator. The vibration isolators may be optional for use with a helicopter having hydraulic assistance on the cyclic control since the hydraulic system generally provides damping of cyclic oscillations. The vibration isolators reduce the two per revolution oscillating motion, that is present in the R22 rotorcraft control linkage and other light helicopters, to prevent vibratory loads on the rotorcraft control and to increase the fatigue life of the actuator components. The cyclic vibration isolators are described in detail below.

Figure 5:
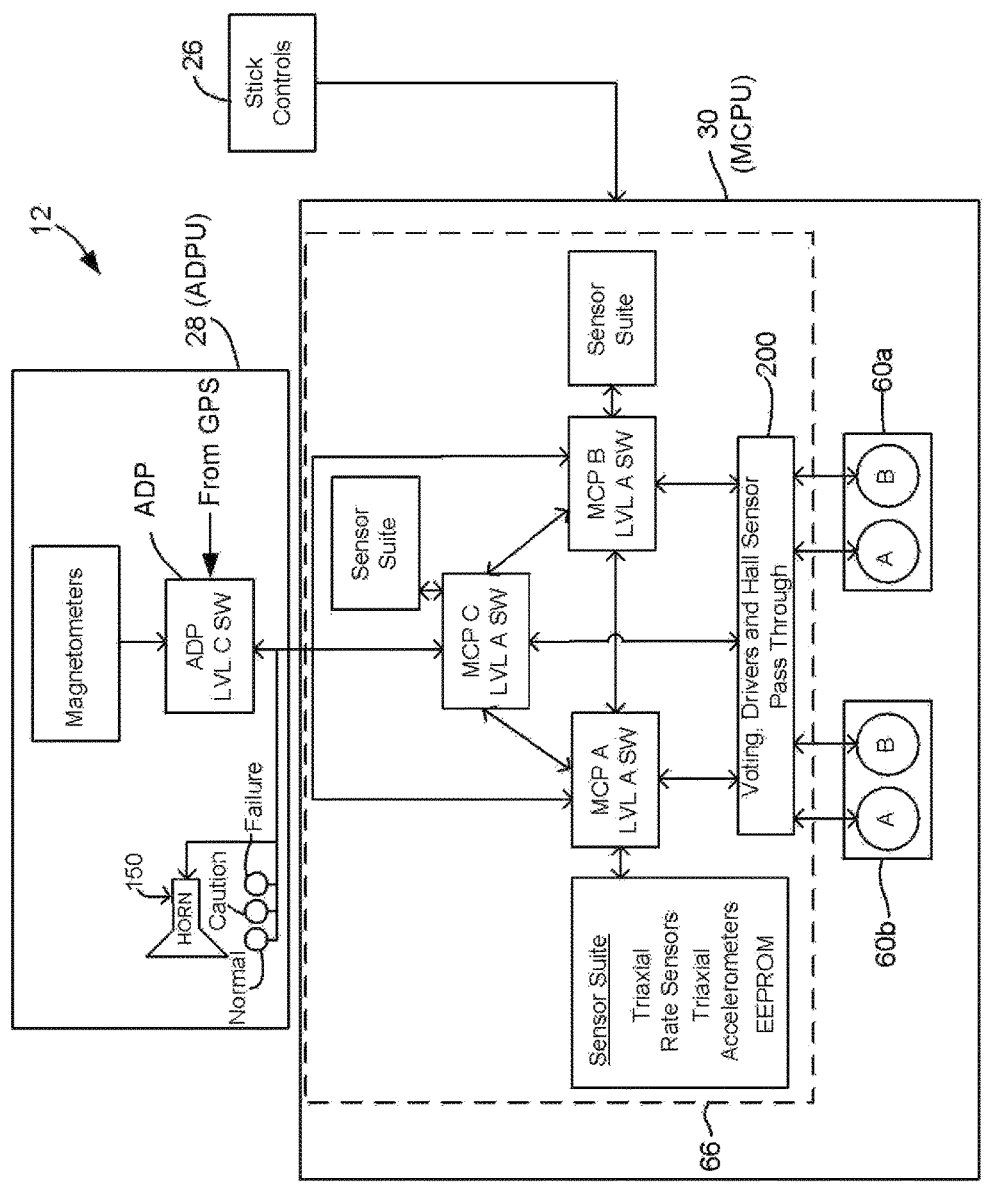
FIG. 5 is a block diagram that illustrates an embodiment of the autopilot of the present disclosure.

Having described the mechanical components of the autopilot in detail above, it is now appropriate to describe the autopilot in terms of the relationship between the aforedescribed components and related control electronics. In particular, FIG. 5 is a block diagram of an embodiment of autopilot 12. In this regard, main unit 30 comprising enclosure 31, the pitch and roll actuators 60 and electronics 66 may be referred to hereinafter as the Motor Control Processor Unit (MCPU) or main autopilot unit 30. The MCPU includes three microprocessors, each of which may be referred to as a Motor Control Processor (MCP). There are three MCPs, individually designated as MCP A, MCP B and MCP C. These processor units each access a sensor suite of tri-axial MEMS rate sensors and tri-axial MEMS accelerometers. The MCPs are used to provide an inner loop of an overall control system having an inner control loop and an outer control loop. The MCPs provide commands to brushless DC motors, Motor A and Motor B of pitch actuator 60*a* and roll actuator 60*b*, driving the control system for the helicopter. All inter-processor communication can be through a serial bus that is natively supplied on each of the processors. Data integrity can be protected, for example, through the use of a cyclic redundancy check (CRC) incorporated into the data stream.

The Federal Aviation Administration (FAA) certifies airborne system software under a version of DO-178. At the time of this writing, DO-178C has been released. This document specifies Design Assurance Levels (DALs) based on the criticality of software failure in a given system. For example, DAL A is designated as "catastrophic" and is assigned where a failure may cause a crash. As another example, DAL C is designated as "major" and is assigned where a failure is significant and may lead to passenger discomfort or increased crew workload. Each one of the three MCPs can execute identical DAL A software to constitute a triple-redundant system. The motor control processors are interconnected so that they can share data. Each processor reads its sensor suite and compares its data with sensor data coming from the other two processors for purposes of consistency and each motor control processor computes averages of all the corresponding sensors to use for further processing. In another embodiment, median values can be determined, as opposed to averages. Sensor data determined to be erroneous is eliminated from the averaging. A warning signal of sound and/or light can be sent to autopilot display processor unit (ADPU) 28 on instrument panel 20 (FIG. 1). Haptic feedback such as, for example, stick shaking can be used alone or in combination with other warning signal indications. In an embodiment, status lights, best seen in the enlarged inset view of the ADPU in FIG. 1, include green (normal), amber (caution) and red (critical failure), as well as dual warning horns to provide system status indications. The warning horns also provide system status notifications and alarms along with the status lights. Both the status lights and horns interface directly to the MCPs. In some embodiments, sounds and/or warnings can be transmitted over the helicopter audio system such that notifications can be heard in the pilot's headset as well as or in lieu of being issued from the horn. Complementing the status lights and horns is a display which provides current autopilot system settings such as engagement status, track, slaved gyroscopic heading, altitude, speed over ground and any warning messages. Also on the panel is a testing button which initiates an Initiated Built-In Test (IBIT).

The MCPs also read Hall sensor data from the actuator motors, which can be used to indicate the current position of each actuator, and a command signal coming from an autopilot display processor (ADP) which forms part of the ADPU. In this regard, the ADPU serves as the outer control loop to provide command signals to the inner loop. Using all these data, each MCP calculates a motor control signal for the motors in terms of a PWM (Pulse Width Modulation) and direction of rotation. Each processor also uses the Hall sensor data to control the power connections to the armature of the brushless motors assigned to it. Each MCP compares its PWM command signal and rotation direction for the pitch and roll actuators with commands generated by the other two MCPs for agreement. Since all processors are using the same data to compute motor control signals, they should produce identical output signals. Signals for agreement/disagreement with the other two processors are sent to a voting section 200, an embodiment of which is shown in detail in the above incorporated U.S. patent application Ser. No. 13/763,574, but the operation of which is described in further detail below for purposes of completeness. In addition to vote handling/arbitration, section 200 also serves as a pass through for Hall sensor data from each of the motors to an appropriate one of the MCPs. As discussed above, the Hall sensor readings are used to generate motor control signals for the brushless DC motors and can serve to provide a high resolution indication of the output shaft position of the actuator.

As described above, each actuator includes motor A and motor B. Each individual motor is controlled by one MCP. Thus only MCP A and MCP B control motors. In particular, MCP A controls motor A in each of pitch actuator 60*a* and roll actuator 60*b*. while MCP B controls motor B in each of pitch actuator 60*a* and roll actuator 60*b*. MCP C (the third processor) does not control a motor but performs all calculations to generate stick commands as if it were controlling a motor. In this regard, a third motor can readily be added to each actuator (see FIG. 4) that would engage gear 102 in the same manner as motor A and motor B, but responsive to MCP C. The latter, however, votes in a manner that is identical to the other two processors. For example, if MCP A and MCP C agree on the control of the pitch motor, but MCP B does not, then MCP B will be voted out from control of its pitch motor, MCP B will still control its roll motor unless MCP A and MCP C also vote out control of that motor. On the other hand, if MCP C is voted out, no actuator motors will be affected, but a warning light and horn can be actuated as would be the case for the MCPs which control motors.

The actuators are designed such that either one of motor A or motor B is independently capable of driving the actuator to control the helicopter. The output shaft of a failed motor will be rotated by the remaining motor. If one of MCP A or MCP B is voted out, the autopilot can continue to function despite the fact that each of these MCPs controls motors. As stated, there can be a warning light and a brief sounding of the horn to notify the pilot that there has been a non-critical autopilot malfunction.

The MCPs have full authority over the controls and are rate limited to a suitable value such as, for example, 5 inches per second. The MCP control section is the only portion of the autopilot that can create a critical or major hazard malfunction. Accordingly, the MCPU is designed as triple-redundant with DAL A designated software for purposes of operating the inner loop of the autopilot. These factors greatly reduce the probability of a critical failure. Applicants recognize, however, that the software corresponding to the outer loop can be partitioned from the inner loop software in a way that allows the outer loop software to be designated at a lower DAL C certification.

The outer loop software is handled by the ADP (Autopilot Display Processor) in ADPU 28. The MCPs convert requested autopilot commands from the ADP into actuator control signals that can drive the actuator motors within defined operational limits. In this regard, it should be appreciated that DAL A software is handled by the triple redundant MCPs while DAL C, outer loop software is handled by a completely different processor. By way of still further explanation, a single executable runs on each MCP. The MCPs, which may be referred to as the triplex processors, can execute identical software. Thus, the autopilot control laws are partitioned between the ADP and triplex processors. The ADP processes the outer loop dynamics and autopilot modes while the triplex MCPs process the inner loop dynamics. The ADP further provides the pilot's graphical and testing interface to the autopilot and executes the autopilot control laws to determine actuator commands based on sensor and GPS data. Accordingly, the ADP interfaces directly with the GPS and triaxial magnetometers and indirectly with triaxial accelerometers and triaxial rate gyros of the MCPs which provide the roll-pitch attitude, position, altitude, ground speed, course and heading data. The ADP monitors the health of these sensors but does not check the validity of the data. The IBIT test switch also interfaces to the ADP. In another embodiment, the ADP can be designed in the same manner as the MCPU with triple redundancy. With both the MCPU and ADP in a triple redundancy configuration, the autopilot can tolerate a single failure in either of these units and still remain fully functional.

The MCPs accept data from the ADP which can include commands as well as data from an external GPS. The data can be screened by each MCP to detect errors or malfunctions. The control command is rate-displacement limited by the MCPs. The MCPs will not allow a command from the ADP to create a hazardous response from the helicopter. GPS data is used by the ADP. The GPS and magnetometer data are both used in the MCPs to remove drift errors associated with the rate sensors of each sensor suite and to determine roll, pitch and heading. The GPS data can also be checked for errors.

The MCPs constantly monitor for both internal and external faults. In the event of an ADP failure, any one MCP can immediately recognize the situation based on update rate and control signal conformity. In response, the MCPU, in one embodiment, will then cause the inner control loop to hold the helicopter straight and level. In another embodiment, the MCPU can act in the manner of a SAS (Stability Augmentation System) or a dead reckoning system and control the helicopter based on internal rate signals. The MCPs will attempt to hold zero rates and/or heading and also actuate a horn and light to indicate a failure. It has been empirically demonstrated that the helicopter can maintain prolonged flight with only MCP control, providing more than ample time for the pilot to take control and disengage the autopilot. The ability to detect excessive autopilot response resides in the triplex motor controllers as detailed herein. The triplex processors monitor sensors and also check to confirm that calculated responses are within limits. Pitch and roll commands from the ADP are limited based on such command filtering by each of the triplex processors. Each triplex processor can detect whether a limit has been exceeded and can initiate safe shut down of the autopilot. Pitch and roll axis commands can be monitored identically but with different limit values. The monitors are dynamic; that is, the limit values can be frequency/rate dependent. Redundancy management features for each axis can include stick rate limiting and body rate monitoring.

The sensor suite of each MCP can also include memory such as, for example, EEPROM or other suitable memory. If there is an error detected by an MCP during operation, the error code can be stored in the EEPROM of the sensor suite associated with the MCP. The EEPROM can later be read in the context of determining the cause of failure. The EEPROMs can also contain parameters specific to the model of the helicopter in which the autopilot is installed such as, for example, control loop constants, sensor offsets and gains.

Figure 6:
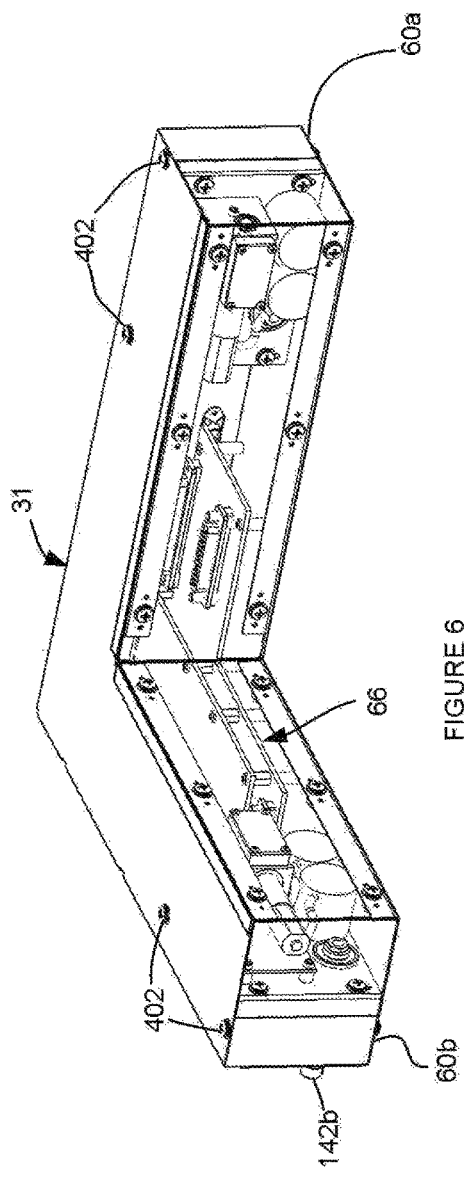
FIGS. 6 and 7 are diagrammatic views, in perspective, of an embodiment of a main unit enclosure and associated components.
Figure 7:
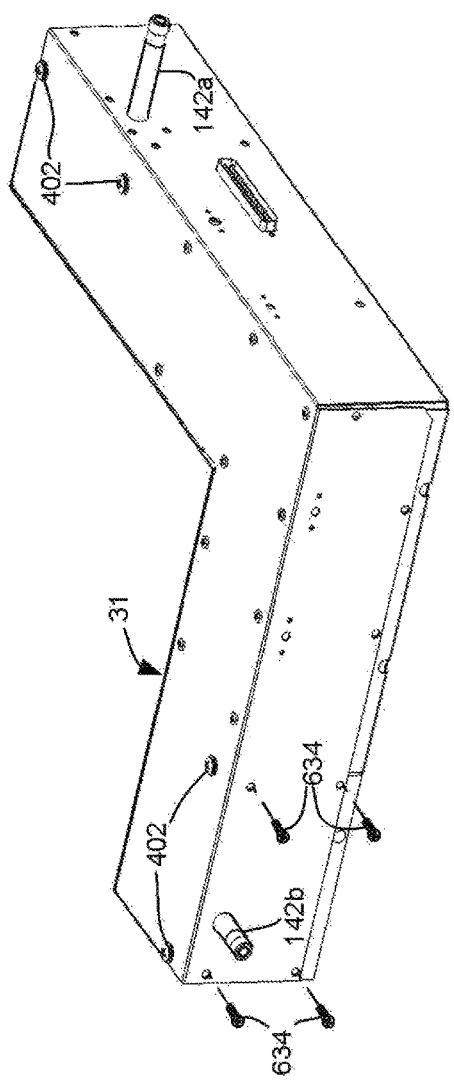

Referring to FIGS. 6 and 7 in conjunction with FIGS. 1-3, it should be appreciated that enclosure 31 can provide benefits with respect to installation of the autopilot system into a helicopter that are heretofore unseen. FIGS. 6 and 7 provide perspective views of an embodiment of the enclosure including main electronics unit 66 and actuators 60a and 60b mounted within the enclosure such that output shafts 142a and 142b of each respective actuator extends outward from the interior of the enclosure. It is noted that actuator shaft 142a is longer than actuator shaft 142b based on installation specific requirements. The length of each actuator shaft can be customized in view of an installation in a given type of helicopter. FIG. 6 provides a front/top, perspective view, while FIG. 7 provides a back/bottom, perspective view. Each actuator housing 82 (FIG. 3) can be configured to receive suitable fasteners 402 such as, for example, threaded fasteners through holes that are defined by enclosure 31 in order to support the actuator within enclosure 31. FIG. 6 illustrates first pairs of fasteners 402 that extend through the top cover of the enclosure and into each actuator housing while FIG. 7 illustrates second pairs of fasteners 402 that extend through the top cover of the enclosure and into each actuator housing. Thus, the actuators and main electronics unit are commonly received within the interior space defined by the enclosure and mounted/captured against interior surfaces of the walls of the enclosure.

The main electronics unit at least includes motor drivers for driving motors (BLDC motors in the present example) as well as the inner control loop of the autopilot system as shown, for example, in FIG. 5. Additional components that can be received within enclosure 31 can include, for example, a power supply section for powering the entire autopilot system. Each MCP processor can be provided with an independent power supply that is commonly housed within enclosure 31. While an L-shaped enclosure is illustrated for installation in the R22, it should be appreciated that the enclosure can be of any suitable shape in view of an intended application and is not limited to L-shaped so long as the main electronics unit and actuators can be commonly received within the enclosure. Enclosure 31 can be configured to handle the forces generated by the actuators with the actuators mounted directly on the walls or plates of the enclosure, for example, using fasteners. In the present embodiment, each actuator is secured against the bottom plate, the top plate and one of the plates through which the actuator shafts pass. The use of enclosure 31 for purposes of housing the bulk of the electronics, control system and actuators of the autopilot embodies a minimally intrusive lightweight package. The overall weight of the components supported by enclosure 31 and the enclosure itself can be less than 8 pounds with the weight of the enclosure itself being less than 7 pounds. In contrast, prior art autopilot systems of which Applicants are aware require separate installation of the main electronics assembly and each actuator. Typically, each actuator, in a prior art autopilot, is independently and directly mounted to the structure of the helicopter itself with the need for special or customized mounting provisions such as structural reinforcements associated with each actuator. The use of enclosure 31, as taught herein, avoids the need for such complex independent installation associated with the actuators to provide benefits that can include reducing installation time as well as reducing the overall weight of the autopilot system. In fact, the installation of enclosure 31 can be accomplished through the use of a straightforward drill template, resulting in a great degree of accuracy insofar as the positioning of the enclosure while being highly economical.

Figure 8:
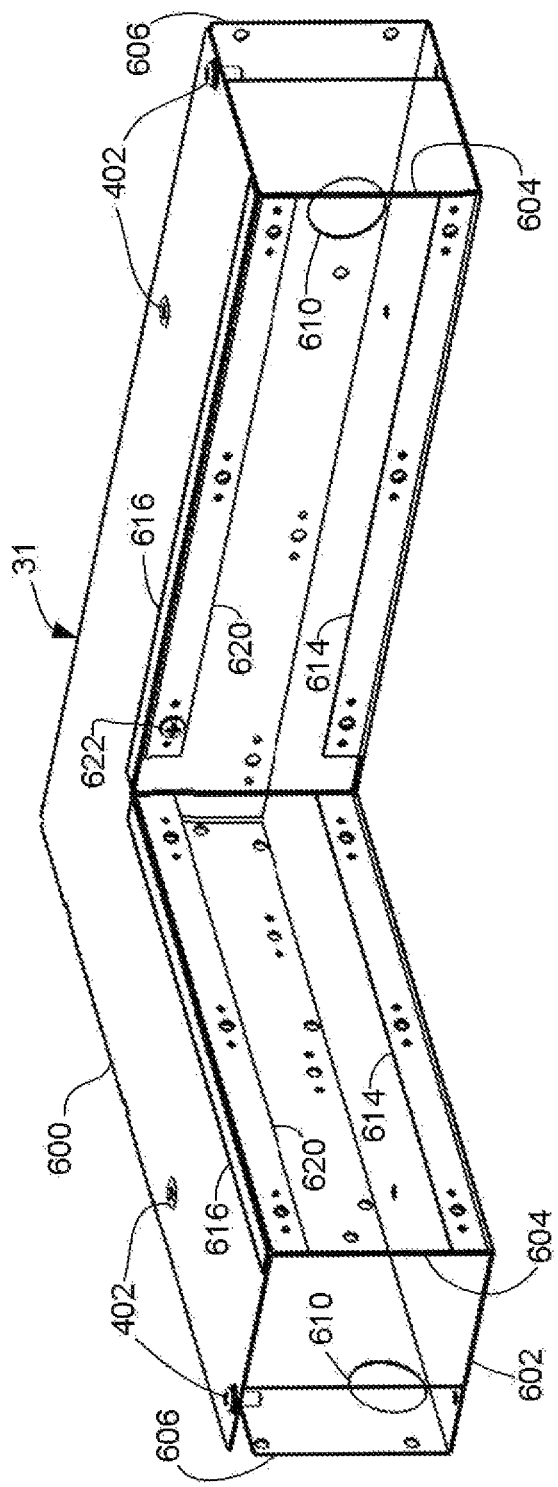
FIG. 8 is another diagrammatic view, in perspective, of the main unit enclosure of FIGS. 7 and 8, shown here to illustrate further details of its structure.

Turning to FIG. 8, an embodiment of enclosure 31 is shown in a perspective view, generally from above, without components installed therein and with selected elements rendered as transparent to reveal the appearance of otherwise hidden elements. The enclosure can be formed, by way of non-limiting example, by a top plate 600 a bottom, mounting plate 602, front covers/plates 604 and back covers/plates 606. The back covers define openings 610 for receiving output shafts of the actuators. The various panels or plates of the enclosure can be attached to one another in any suitable manner such as, for example, using welding and or suitable fasteners such as rivets and/or threaded fasteners. In the present embodiment, mounting plate 602 includes front flanges 614 that extend upwardly. Front covers 604 can include top flanges 616 that can extend over top plate 600. Top plate 600 can include front flanges 620 that extend downward in the view of the figure. Fasteners 622, one of which is shown, can be received in appropriate openings for purposes of securing the enclosure components to one another. In the present embodiment, the actuators can be supported by multiple panels of the enclosure such as the rear sidewalls, top plate 600 and mounting plate 602. In this regard, actuator housings 82 (FIG. 3) can contribute to the overall structural rigidity of enclosure 31.

Referring to FIG. 2, the actuator shafts can interface to the control linkage components through sidewalls or bulkheads of the helicopter baggage compartment such as, for example, a first bulkhead 630 through which the pitch actuator output shaft passes and a second bulkhead 632 through which the roll actuator shaft passes. Bulkhead 630 has been rendered as transparent for illustrative purposes. As will be further described and by way of non-limiting example, enclosure 31 can be removably fixedly mounted against bulkheads 630 and 632. In this regard, it is noted that a clearance is present below the enclosure in the present embodiment since the floor of the baggage compartment below the unit is not flat. Of course, such details can be dependent on installation in a given helicopter and are not intended as limiting. Fasteners 634, as seen in FIG. 7 and two of which are partially visible in FIG. 2, can be used for purposes of mounting enclosure 31 to bulkheads 630 and 632 by installing these fasteners through the respective bulkheads to threadingly engage the actuator housings. Additional fasteners can be used to secure enclosure 31 to the bulkheads, as will be described. In any installation, main enclosure 31 can provide both structural support and shielding. The enclosure can be formed from any suitable material such as sheet materials of aluminum.

Figure 9:
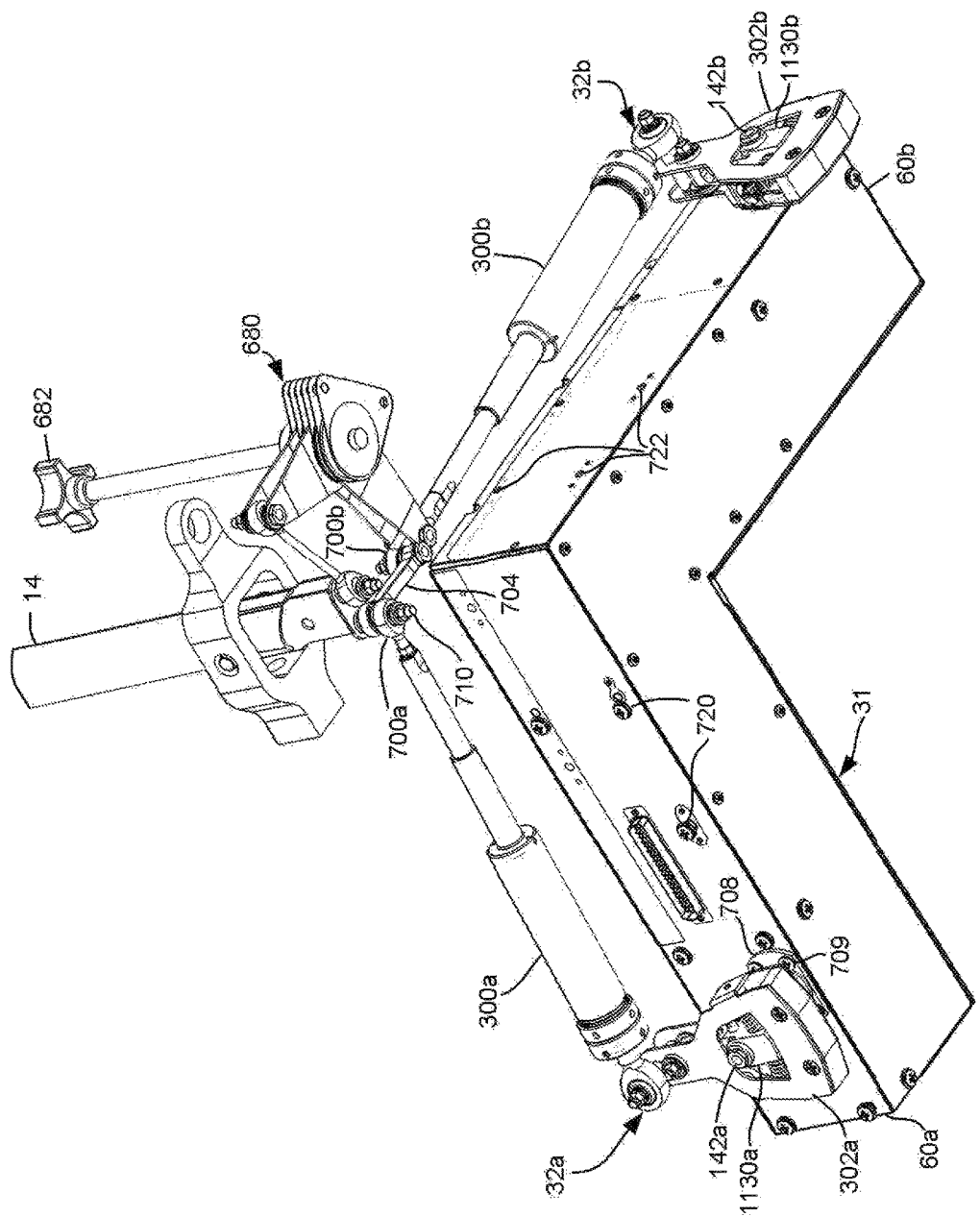
FIGS. 9 and 10 are diagrammatic views, taken from differing perspectives, showing the main unit enclosure and actuator linkages in an installed condition in relation to a cyclic control of the helicopter.
Figure 10:
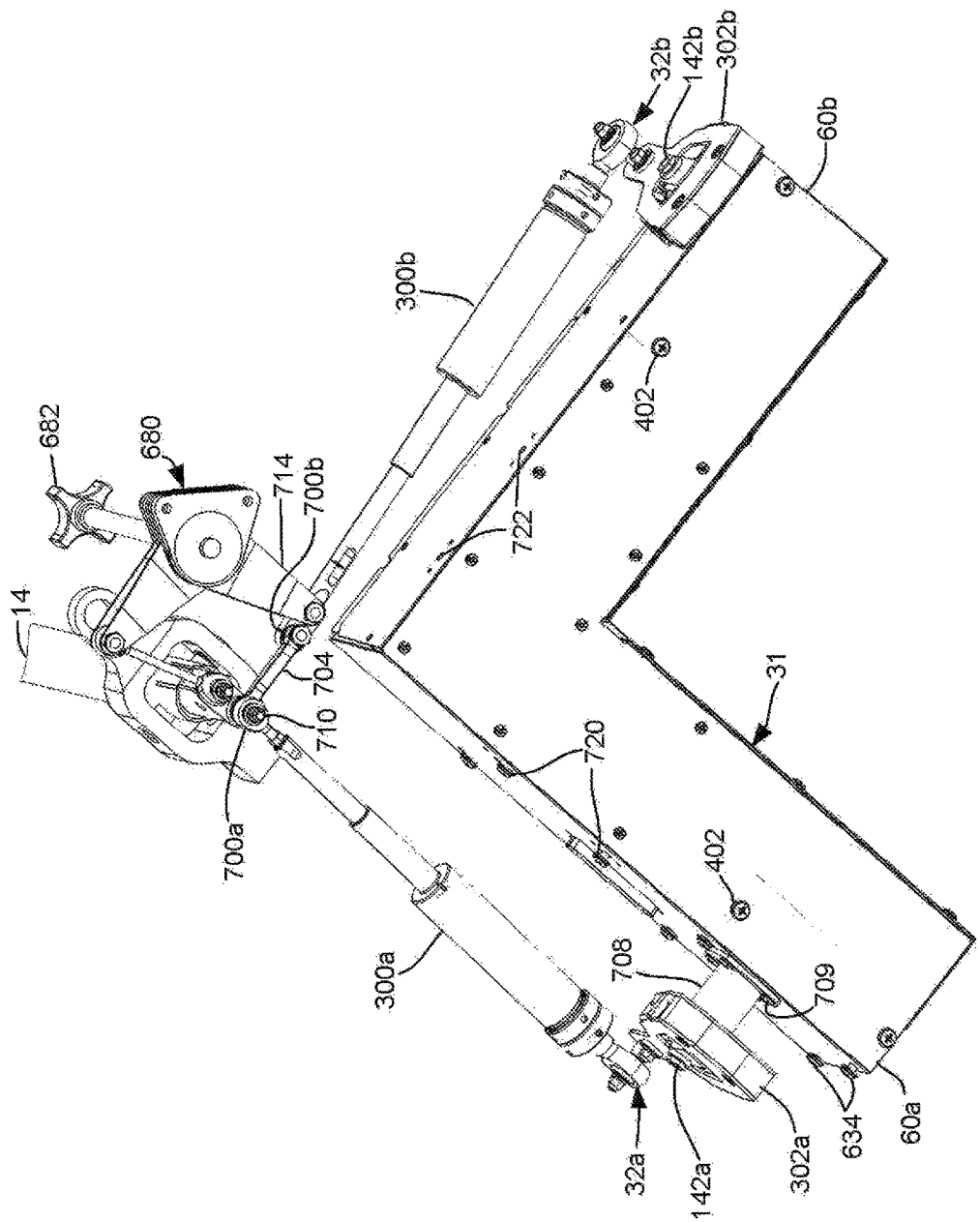

FIGS. 9 and 10 are perspective views looking up toward an embodiment of enclosure 31 in an installed condition from somewhat different angles but with both figures limited to showing enclosure 31 having pitch control linkage 32*a* and roll control linkage 32*b* installed and interfaced to a lower end of stick 14, which is only partially shown. The lower end of the stick can move in any lateral direction responsive to movement induced by the pilot. A friction arrangement 680 can be provided as original equipment in the helicopter and is adjustable using a tension knob 682 in a manner that will be familiar to those of ordinary skill in the art. The distal end of force-limited link 300*a* (pitch) includes a pivot type mount 700*a* such as, for example, a ball and socket type mount that is pivotally attached to the lowermost end of stick 14. For roll autopilot actuations, a pivot type mount 700*b*, at a distal end of force-limited link 300*b*, can be of the same type and is pivotally attached to the lowermost end of stick 14 via a roll linkage bar 704. The latter is itself configured for pivotal attachment to the lowermost end of the stick. Original torque tube 25*a* and roll control rod 25*b* are understood to be present, as seen in FIG. 1, but have not been shown in the present figure for purposes of illustrative clarity. The torque tube and roll control rod can be unchanged from their original forms for purposes of communicating pilot actuations to the swash plate of the helicopter in order to accomplish cyclic control.

Still referring to FIGS. 9 and 10, output shaft 142*a* (see FIG. 2) of pitch actuator 60*a* is received by vibration isolator 302*a* which is in turn pivotally attached to force-limited link 300*a*. Similarly, output shaft 142*b* (see FIG. 2) of pitch actuator 60*b* is received by vibration isolator 302*b* which is in turn pivotally attached to force limited link 300*b*. As noted above, actuator shaft 142*a* is longer than actuator shaft 142*b*. As best seen in FIG. 10, a bearing assembly 708 can be used to support the extended actuator shaft. The bearing assembly can be attached to enclosure 31 in any suitable manner such as, for example, by using removable fasteners 709, as illustrated. In the present embodiment, bulkhead 630 (seen in FIG. 2) is captured between the bearing housing and the enclosure with fasteners 709 threadingly engaging the housing of pitch actuator 60*a*. Enclosure 31, the actuators, the vibration isolators and the force-limited links can be preassembled for installation as a unit into the helicopter. It should be appreciated that a bolt forming a pitch/roll attachment point 710 can be extended for receiving the distal end pivot mount of tension link 300*a* (pitch) as well as the pivot mount of roll linkage bar 704. The opposite end of roll linkage bar 704 is pivotally attached to the distal end of roll force-limited link 300*b* which also defines an opening for attachment of roll friction arms 714. An access hole 716 (FIG. 2) allows the roll actuator control link to pass through from the landing gear tunnel to the console tunnel of the helicopter. Enclosure 31 can be further removably secured against bulkheads 630 and 632, for example, using threaded fasteners 720, only two of which are individually designated, that can extend through respective ones of the bulkheads to engage nut-plates of any suitable type mounted within the interior of enclosure 31. It is noted that openings 722 have been shown that are likewise configured with nut-plates for receiving additional fasteners 720. Any suitable number of such fasteners can be used. Moreover, the use of fasteners 720 is not intended as limiting and the enclosure can be secured into an installed position in any suitable manner. Removability of the enclosure can facilitate the configuration of overall main autopilot unit 30 as a non user serviceable item. That is, if any concern arises with respect to the operation of the main autopilot unit, it can readily be completely removed from the helicopter and delivered to a service facility for repair.

As seen in FIGS. 9 and 10 and aside from enclosure 31, the autopilot mechanical system includes three major mechanical components: actuators 60, vibration isolators 302 and force-limited links 300. The actuators impart motion to the rotorcraft control system while the vibration isolators reduce the two per revolution oscillating motion that is present, for example, in a light rotorcraft control linkage such as the R22, to prevent vibratory loads on the rotorcraft control and to increase the fatigue life of the actuator component, as discussed above. Force-limited links 300 transmit motion from the actuator to the rotorcraft control linkage while allowing the pilot to override inputs from actuators 60. In a helicopter having a control linkage that is not subject to cyclic oscillation such as, for example, a helicopter having a hydraulically assisted cyclic control system, vibration isolators 302 can be replaced with rigid arm members that can be non-resilient at least from a practical standpoint.

Figure 11:
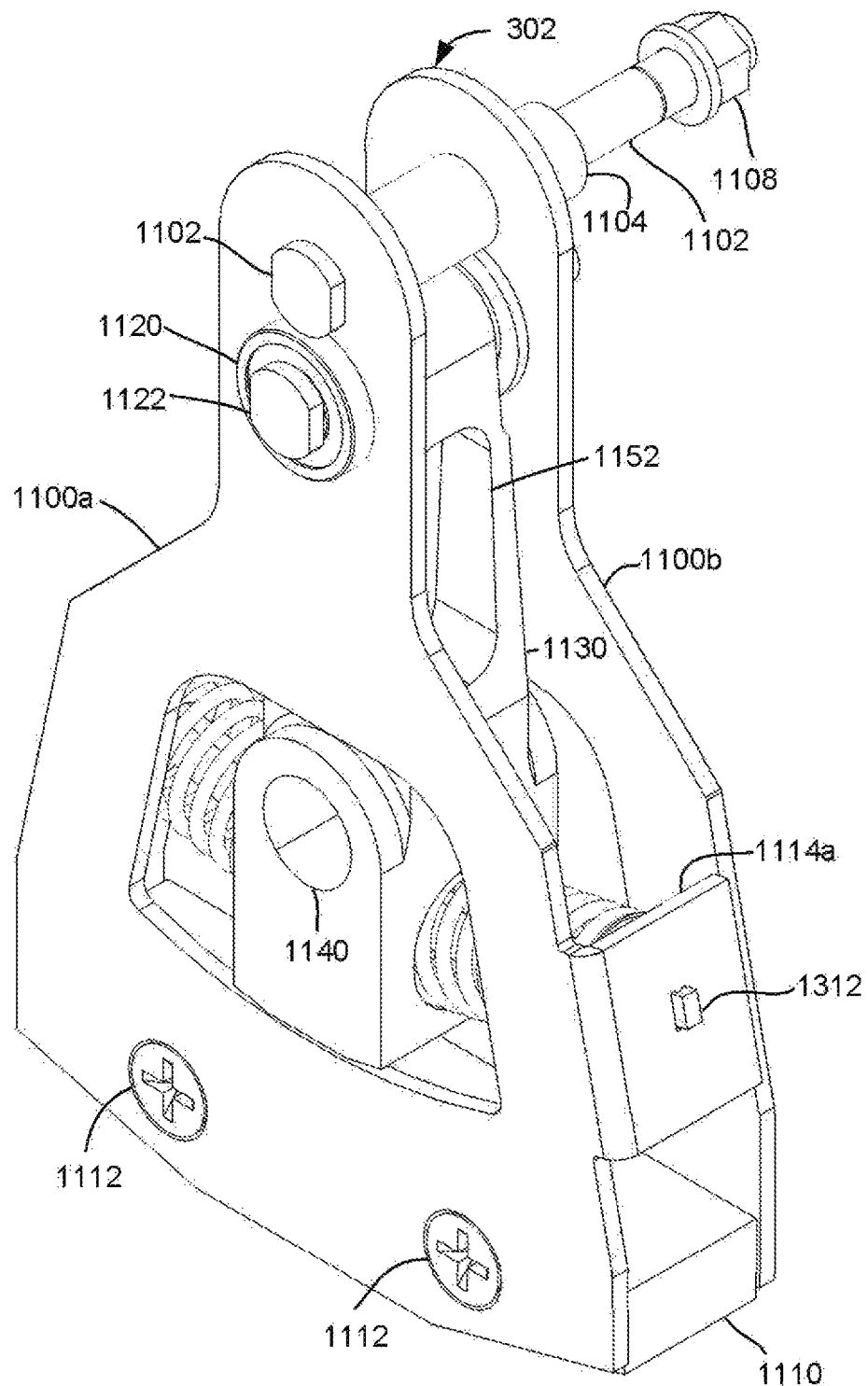
FIG. 11 is an assembly view, in perspective, of an embodiment of a cyclic vibration isolator according to the present disclosure.

Having described actuators 60 in detail above, attention is now directed to FIG. 11 which illustrates additional details with respect to vibration isolator 302. As discussed above, vibration isolators 302*a* and 302*b* can be of identical construction and therefore the reference number 302 can refer to either vibration isolator. The vibration isolator includes weight arms 1100*a* and 1100*b* which can be identical in construction. The weight arms can be referred to collectively by the reference number 1100 and can be formed of any suitable sheet material such as, for example, aluminum. A first end of the weight arms receive a pin 1102 that is configured for engaging one end of force limited link 300 (FIGS. 9 and 10). The weight arms can be fixedly attached to pin 1102 in any suitable manner such as, for example, using a pressed fit or welding. In this regard, it is not necessary for the pin to pivotally engage the weight arms. Pin 1102 can define a shoulder 1104 and include a threaded distal end such that one end of the force limited link can be captured between shoulder 1104 and a nut 1108. Opposite ends of weight arms 1100 are fixedly attached to a tuning weight 1110 that can be formed from any suitable material such as, for example, brass. Attachment can be accomplished in any suitable manner such as through the use of threaded fasteners 1112. Each weight arm can further include a spring keeper tab 1114*a* or 1114*b* that can be integrally formed and bent transversely to the main body of the weight arm. The spring keeper tabs will be described in further detail below. The weight arms receive a bearing set 1120 having a pin 1122 that extends through a pivot end of a control arm 1130 such that the weight arms can pivot in unison in relation to control arm 1130. It is noted that each actuator shaft 142 (see FIGS. 7 and 9) supports one control arm, as shown in FIG. 9 and designated by the reference numbers 1130a and 1130b.

Figure 12:
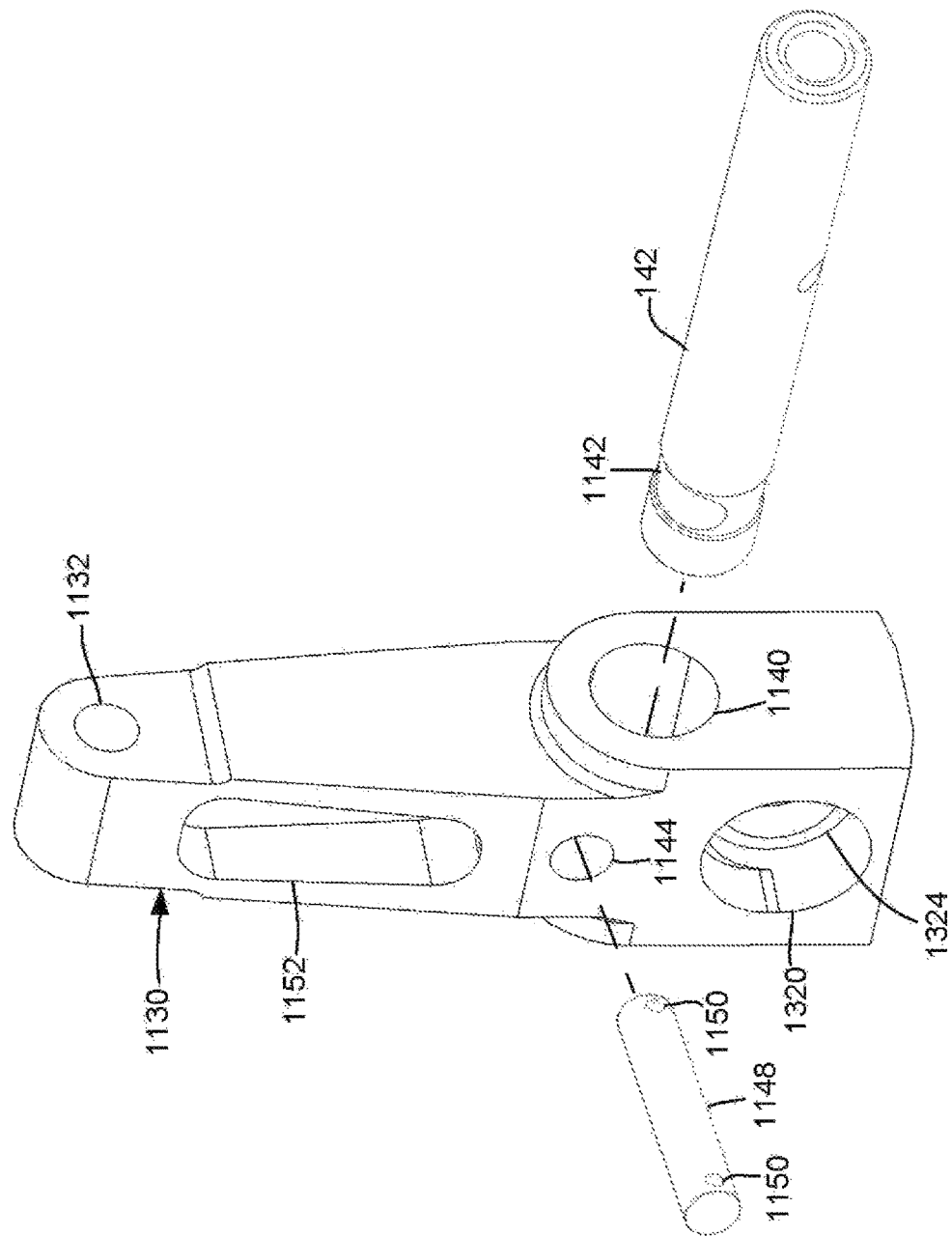
FIG. 12 is a diagrammatic view, in perspective, of a control arm that forms part of the vibration isolator of FIG. 11.

Referring to FIG. 12 in conjunction with FIG. 11, the former is a perspective, exploded view which illustrates one control arm 1130 and related components. Each control arm defines a force limited link aperture 1132 and an actuator shaft aperture 1140 that is configured to receive one of actuator shafts 142. When installed, a saddle 1142 on the actuator shaft is aligned with a key aperture 1144 that receives a cross-pin key 1148. The latter includes through openings 1150, for example, to receive safety wire (not shown) to secure the cross-pin key in its installed position. Each control arm can define opposing pockets 1152 of removed material which, as an option, can reduce the weight of the control arm.

Figure 13:
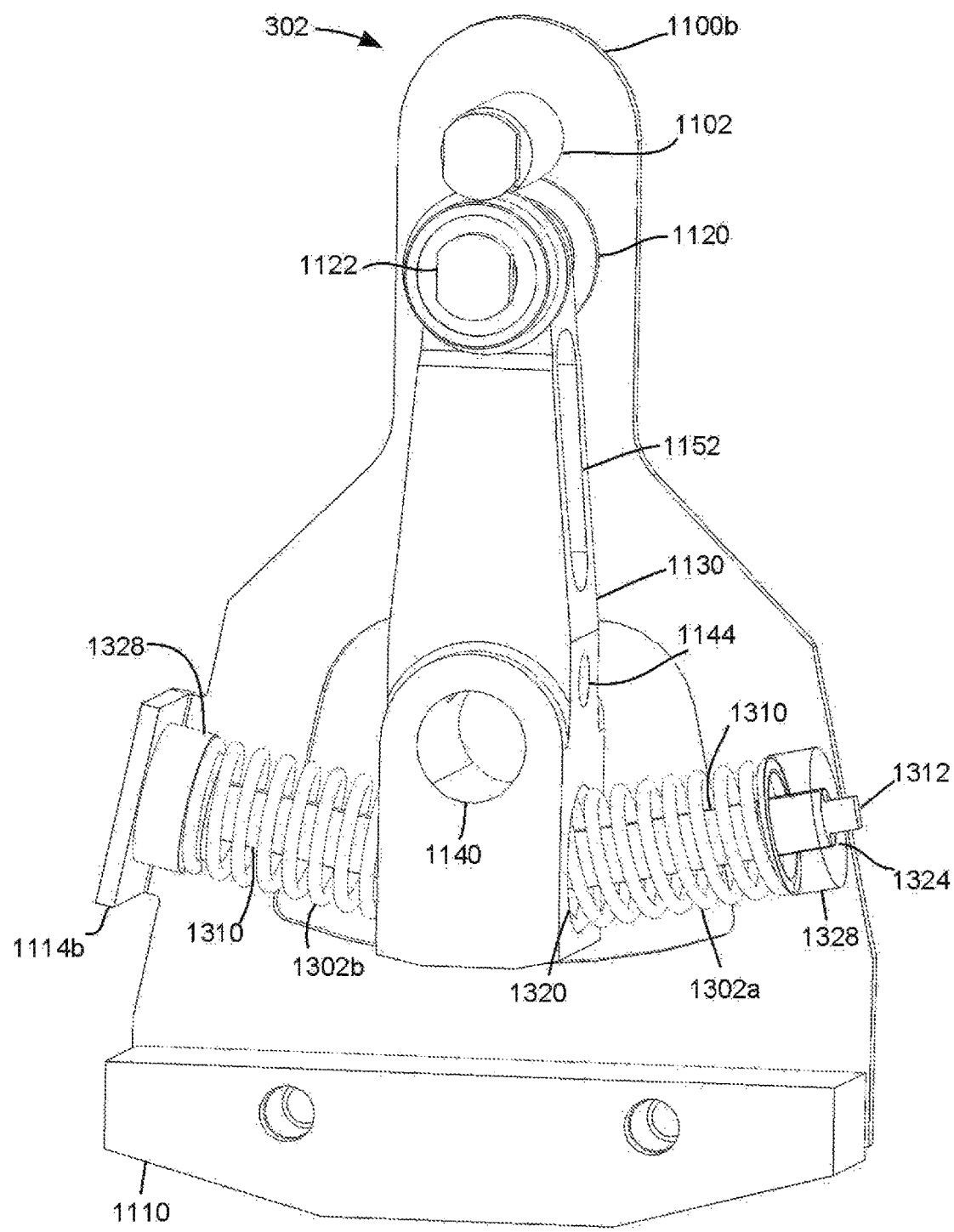
FIG. 13 is a diagrammatic, partial view in perspective of the vibration isolator of FIG. 11, shown in a way that reveals further details of its internal structure.

Attention is now directed to FIGS. 11-13. FIG. 13 is a perspective view of vibration isolator 302 with weight arm 1100a rendered as transparent for purposes of illustrative clarity. A first isolation spring 1302a is captured between keeper tab 1114a (FIG. 11) of weight arm 1100a and control arm 1130 while a second isolation spring 1302b is captured between keeper tab 1114b of weight arm 1100b and control arm 1130. Springs 1302 can be formed from any suitable material such as, for example, steel or corrosion resistant alloys such as nickel chromium based alloys. A spring keeper 1310 passes through the interior space of each isolator spring and through control arm 1130 such that the spring keeper is captured between keeper tabs 1114a and 1114b. In this regard, the spring keeper can include, for example, a rectangular or other suitable cross-sectional shape with a head 1312 of reduced size in comparison to the cross-sectional shape of the overall length of the spring keeper. Thus, the base of head 1312 defines one or more shoulders that can be received against an inside surface of each keeper tab with head 1312 itself received in a suitable/complementary opening defined by the keeper tab as shown in FIG. 11. Control arm 1130 (FIG. 12) defines opposing spring pockets 1320 that receive respective inner ends of the isolation springs against a shoulder 1324 while the outer end of each isolation spring biases against a spacer 1328 that, in turn, biases against one of the keeper tabs. It is noted that one of the spacers has been rendered as transparent in the view of FIG. 13 in order to facilitate a view of one end of spring keeper 1310. In an embodiment, each shoulder 1324 can be angled such that when an associated isolation spring 1302 is fully compressed, the shoulder defines a plane that is at least approximately parallel to the associated keeper tab in a confronting relationship therewith.

Vibration isolator 302 serves as a variable compliance device acting between one actuator 60 and an associated force-limited link 300. While further detail will be provided below, for the moment is sufficient to note that force-limited links 300 are effectively rigid with respect to the cyclic vibration or stick shaking frequency and are likewise effectively rigid responsive to normal autopilot actuations from actuators 60. The vibration isolator is very stiff for low frequency inputs provided from actuator 60 via the actuator shaft but is very compliant at the two per revolution cyclic vibration frequency of 17.5 Hz that is present on force limited link 300. During operation, with the actuator shaft at a fixed position, weight arms 1100 oscillate about pivot 1122 in a way that alternately compresses isolation springs 1302 between each weight arm keeper tab 1114 and each control arm 1130 responsive to cyclic stick shaking. Thus, the actuator shaft is effectively isolated from the two per revolution cyclic vibration frequency. At the same time, the frequency response of each actuator 60 is approximately 3 Hz for purposes of rotating the actuator shaft to provide autopilot actuations. Accordingly, there is sufficient separation between the maximum control frequency of actuator inputs and the two per revolution cyclic vibration frequency such that control forces from the actuator output shaft pass through the vibration isolator and onto the helicopter cyclic control system via force tension link 300 while the rotor induced vibratory forces are isolated from the actuators. While the present embodiment of the vibration isolator is configured for use in the R22 helicopter having a cyclic vibration frequency of approximately 17.5 Hz, the vibration isolator can readily be modified for operation with a helicopter that exhibits a different cyclic vibration frequency.

Having described the vibration isolator of the present disclosure in detail above, additional details are now provided with respect to an embodiment that is configured for the 17.5 Hz cyclic vibration that is typical of a Robinson R22 helicopter. That is, the weight arms, serving as an overall output arm of the isolator, the tuning weight and associated dimensions make up a resonant system having a resonant frequency that is at least approximately equal to the cyclic vibration frequency of the helicopter. Of course, the tuning weight can be adjusted to accommodate a range of different resonant frequencies. Similarly, various dimensions can be adjusted to change the resonant frequency, as desired. In the present embodiment, springs 1302 have a combined spring constant of 16.6 lbf/in that is located 2.0 inches from pivot 1122. The tuning weight has an equivalent mass of 0.2 lbm (pound-mass) located 3.3 inches from pivot 1122.

Attention is now directed to FIG. 14 which is a perspective view of an embodiment of force-limited link 300. Initially, it should be appreciated that the force-limited link is designed to serve as a rigid push-pull rod at loads below a predetermined break-away force and to be compliant at loads above the break-away force. This allows the pilot to readily override actuators 60 at any time, even if one or both actuators are jammed. The design can provide for override forces that are greater than normal control forces but which override forces are easily managed by the pilot. In the present embodiment, a first end 1402 of the force limited link is designed for mounting upon shaft 1102 of FIG. 11 while second, opposing end 700 is designed for mounting to engage the cyclic control system as shown, for example, in FIGS. 10 and 11 wherein pivot mount 700a of pitch force-limited link 300a (FIGS. 9 and 10) is attached to the bottom of the stick and pivot mount 700b of roll force limited link 300b is attached to roll linkage bar 704. Each end of the force limited link can utilize a ball and socket type mount which can accommodate motions such as arcuate and side-to-side motions that are characteristic of the movement of the bottom of stick 14 under the control of the pilot. First end 1402 can include an end cap 1404 and lock ring 1406 that threadingly engage a housing 1410. The latter can define an adjustment thread 1412. Accordingly, the length of a main portion of the internal cavity is defined by the end cap in cooperation with the housing and can therefore be adjusted, as will be further described. It is noted that the orientation of the force limited link can be reversed end-for-end in a given installation so long as clearances are adequate.

Referring to FIGS. 15 and 16 in conjunction with FIG. 14, FIG. 15 is a perspective exploded view of force-limited link 300 shown here to illustrate details with respect to its internal components while FIG. 16 is an assembled partially cutaway perspective view. Housing 1410 supports a shaft 1412 for linear movement 1414 as illustrated by a double-headed arrow. Shaft 1412 defines a shoulder 1418 against which a spring bias disk 1420 can be received. A reduced diameter end portion 1422 of the shaft extends from shoulder 1418 to a spring bias head 1424. Spring bias disk 1420 is configured for sliding/lateral movement along end portion 1422 in the direction of arrow 1414 responsive to external biasing forces. When assembled, a top hat 1430 internally receives spring bias head 1424 for movement according to arrow 1414. A crown 1432 of the top hat is, in turn, received within an interior space defined by a spring 1440 with the spring in a preloaded state. Like the spring bias disk, a crown end 1442 of the top hat is configured for lateral/sliding engagement along the length of end portion 1422 of shaft 1412. Spring 1440, for example, is a helical coil spring that can be formed using a suitable material that can be corrosion resistant. Top hat 1430 and spring bias disk 1420 can be formed from any suitable material such as, for example, aluminum. Shaft 1412 can be formed from any suitable material such as, for example, stainless steel. Housing 1410 and end cap 1404 can be formed from any suitable material such as, for example, aluminum.

FIG. 16 illustrates the force-limited link in what can be referred to as a relaxed state with spring 1440 captured between a brim 1444 of the top hat and spring bias disk 1420 such that the spring is preloaded therebetween. In this relaxed state, bias head 1424 is resiliently biased against a crown end 1442 of the top hat. Adjustment ring 1406 can be adjusted to compensate for tolerances between the various components such that spring 1440 is extended as fully as possible while still taking up any play between the various components. That is, brim 1444 just contacts end cap 1404 while spring bias disk 1420 just contacts a shoulder 1450 of housing 1410 and spring bias head 1424 is resiliently biased against crown end 1442 of the top hat. As described above, the relaxed state establishes an amount of compression on spring 1440 that is referred to as a spring preload. The preload establishes the unseating force and represents a minimum level of compression of the spring in the assembly such that it, therefore, will begin to compress whenever external forces are applied to the force limited link that exceed the spring preload/unseating value. In an embodiment, spring 1440 can be subjected to approximately one-half of its ultimate deflected load as the preload value. In the present embodiment, the spring preload is selected as at least approximately 25 lbs. A suitable range of preload values can be selected to accommodate the requirements of a particular helicopter.

FIG. 17 is a partially cutaway perspective view that illustrates a fully retracted state of force-limited link 300. As shown, shaft 1412 is received to a maximum extent within housing 1410 having bias head 1424 and brim 1444 received against end cap 1404. At the same time, spring 1440 is subjected to a maximum level of compression in the assembly. FIG. 17 demonstrates subjecting spring 1440 to an external compressive force of sufficient magnitude above the spring preload to exceed the unseating force and move the ends of the force-limited link toward one another, thereby reducing the length between its opposing ends. Ideally, the force-limited link unseats at a preset load and exerts a uniform force throughout its travel. From a practical standpoint, the spring is selected to provide the required preload force and not exceed a manageable force for the pilot when the link is at full deflection.

FIG. 18 is a partially cutaway perspective view that illustrates a fully extended state of force-limited link 300. As shown, the force limited link is subjected to an external force that is of sufficient magnitude to cause a full extension of the link. It is noted that this force can be of at least approximately the same magnitude as the force, although opposite in effective direction, which produces the fully retracted state of FIG. 17. That is, although spring 1440 is laterally displaced in FIG. 18 as compared to FIG. 17, the spring is compressed to the same length in both figures. Assuming for descriptive purposes that first end 1402 is fixed in position, the external force pulls on second end 700 such that crown end 1442 of the top hat is pulled to the right in the view of the figure in a way that causes brim 1444 to compress spring 1440. This movement results in displacing reduced diameter end portion 1422 of shaft 1412 to the right in the view of the figure until bias head 1424 forces crown end 1442 to contact spring bias disk 1420. In an embodiment, the spring constant of spring 1440 should be sufficiently low to allow the assembly to reach its full ends of travel as shown in FIGS. 17 and 18. While the force-limited link has been illustrated in three different operational conditions, one of ordinary skill in the art will appreciate that the device transitions from one state to another in a manner that is consistent with these descriptions.

The foregoing description of the invention has been presented for purposes of illustration and description. It is not intended to be exhaustive or to limit the invention to the precise form or forms disclosed, and other modifications and variations may be possible in light of the above teachings wherein those of skill in the art will recognize certain modifications, permutations, additions and sub-combinations thereof.

What is claimed is:

1. An autopilot system for a helicopter, comprising:
   an autopilot display unit that is mounted in an instrument console of the helicopter at least for displaying autopilot flight data to a pilot of the helicopter;
   an autopilot main unit enclosure that is removably mounted to the helicopter proximate to a cyclic control of the helicopter and which defines a main unit interior;
   a set of actuators supported within the main unit interior including a pitch actuator having a pitch actuator output shaft and a roll actuator having a roll actuator output shaft such that no more than the pitch actuator shaft and the roll actuator shaft of the set of actuators extend at least partially outward from said autopilot main unit enclosure for providing mechanical control forces to the cyclic control of the helicopter; and
   a main unit electronics section supported within said main unit interior and in electrical communication with said autopilot display unit and with said set of actuators for providing electrical control signals to the actuators such that the main unit electronics section and the set of actuators are commonly housed within the main unit interior.

2. The autopilot system of claim 1 wherein the main unit enclosure is L-shaped in a plan view.

3. The autopilot system of claim 2 wherein the main unit enclosure is configured for removable attachment to a pair of existing bulkheads of the helicopter without supplemental reinforcement of the existing bulkheads.

4. The autopilot system of claim 2 wherein the pitch actuator and the roll actuator are supported at opposing ends of the L-shape within the main unit interior.

5. The autopilot system of claim 1 wherein each actuator includes an actuator housing having an upper housing wall and a lower housing wall and the main unit enclosure includes an upper cover and a lower cover such that the actuator housing is supported in the main unit interior with the upper housing wall received against the upper cover and the lower housing wall received against the lower cover.

6. The autopilot system of claim 5 wherein each actuator housing includes a front housing wall and the actuator housing is supported in the main unit interior with the front housing wall received against a sidewall of the main unit enclosure which sidewall extends between the upper cover and the lower cover.

7. The autopilot system of claim 5 wherein the upper cover and the lower cover are each L-shaped.

8. The autopilot system of claim 5 wherein the upper housing wall of each actuator is removably attached to the upper cover and the lower housing wall of each actuator is removably attached to the lower cover.

9. The autopilot system of claim 5 wherein the main unit enclosure includes a first sidewall and a second sidewall each of which sidewalls maintain the upper cover and lower cover in a spaced apart relationship and the pitch actuator shaft extends through the first sidewall while the roll actuator shaft extends through the second sidewall.

10. The autopilot system of claim 9 wherein the main unit enclosure is configured for removable attachment to a pair of existing bulkheads of the helicopter without supplemental reinforcement of the existing bulkheads and the pitch actuator shaft extends through a first one of the bulkheads while the roll actuator shaft extends through a second one of the bulkheads.

11. The autopilot system of claim 1 wherein the main unit electronics section includes an inner loop that is configured to control at least approximately instantaneous attitude of the helicopter.

12. The autopilot system of claim 11 wherein the autopilot display unit includes an outer loop that is configured to issue navigation commands to the inner loop of the main unit electronics section.

* * * * *

UNITED STATES PATENT AND TRADEMARK OFFICE
CERTIFICATE OF CORRECTION

PATENT NO. : 10,059,441 B2
APPLICATION NO. : 15/415469
DATED : August 28, 2018
INVENTOR(S) : Mercer et al.

Page 1 of 1

It is certified that error appears in the above-identified patent and that said Letters Patent is hereby corrected as shown below:

On the Title Page

Item (72) Inventors:
Change "Nicolas Albion" to --Nicholas Albion--

Signed and Sealed this
Nineteenth Day of November, 2019

Andrei Iancu
*Director of the United States Patent and Trademark Office*